Inventor
William V. Goodhue
By his Attorney
Thomas J. Ryan

July 5, 1949. W. V. GOODHUE 2,474,975
GUN-LOADING MECHANISM
Filed May 11, 1944 24 Sheets-Sheet 2

Inventor
William V. Goodhue
By his Attorney
Thomas J. Ryan

July 5, 1949.  W. V. GOODHUE  2,474,975
GUN-LOADING MECHANISM
Filed May 11, 1944  24 Sheets-Sheet 3

Inventor
William V. Goodhue
By his Attorney
Thomas J. Ryan

July 5, 1949.  W. V. GOODHUE  2,474,975
GUN-LOADING MECHANISM
Filed May 11, 1944  24 Sheets-Sheet 4
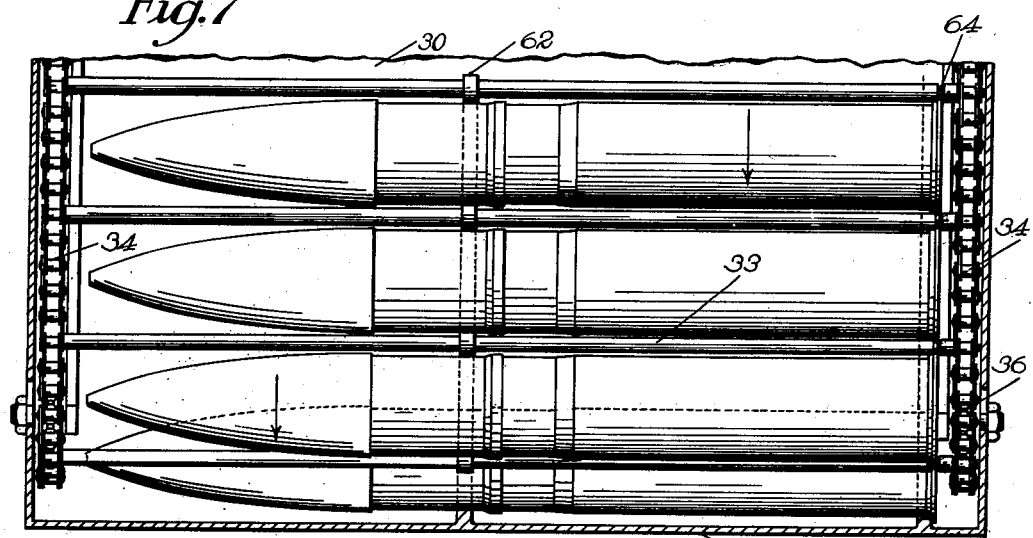
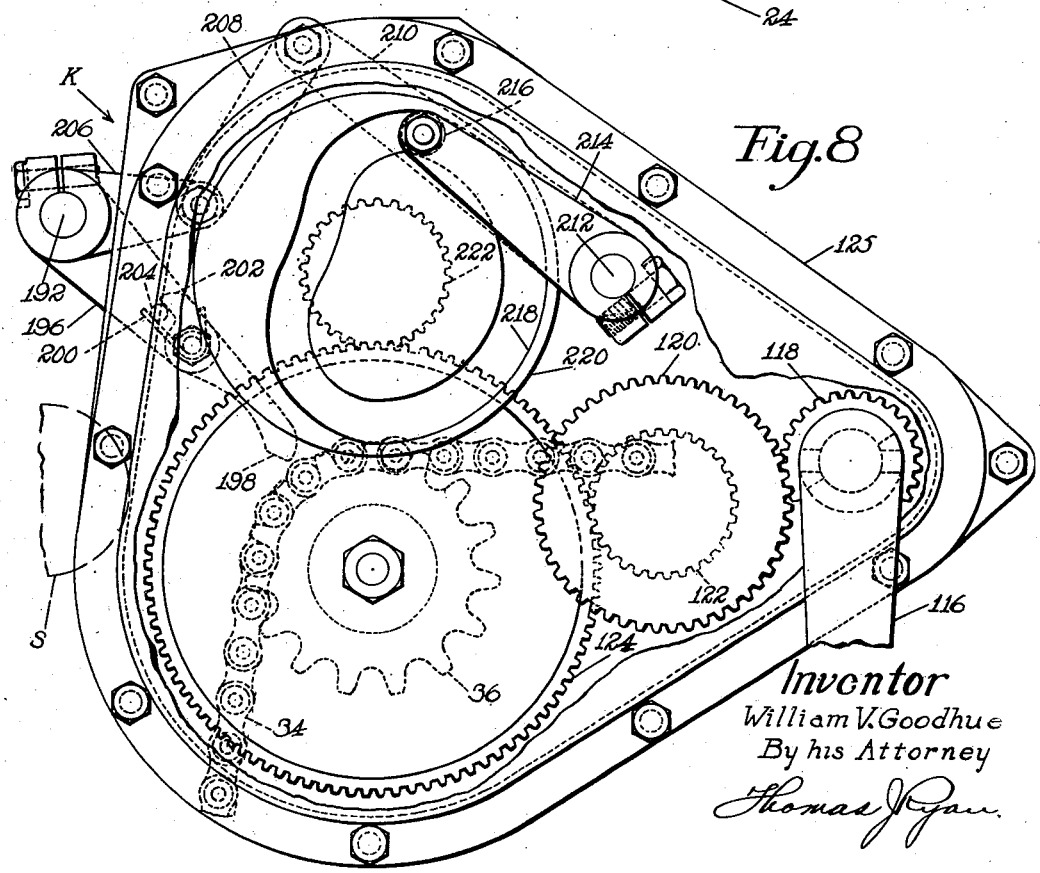
Inventor
William V. Goodhue
By his Attorney
Thomas J. Ryan July 5, 1949.   W. V. GOODHUE   2,474,975
GUN-LOADING MECHANISM
Filed May 11, 1944   24 Sheets-Sheet 5

Inventor
William V. Goodhue
By his Attorney
Thomas J. Ryan

July 5, 1949.  W. V. GOODHUE  2,474,975
GUN-LOADING MECHANISM
Filed May 11, 1944  24 Sheets-Sheet 6
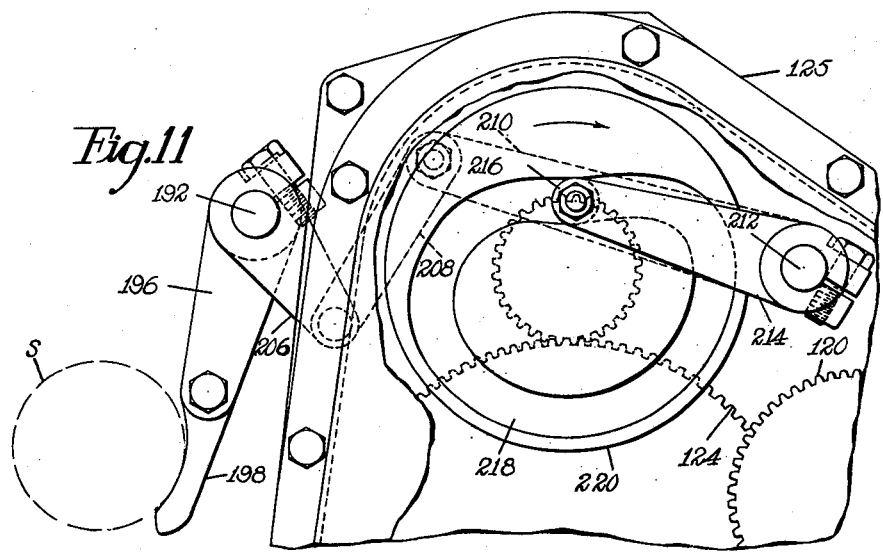
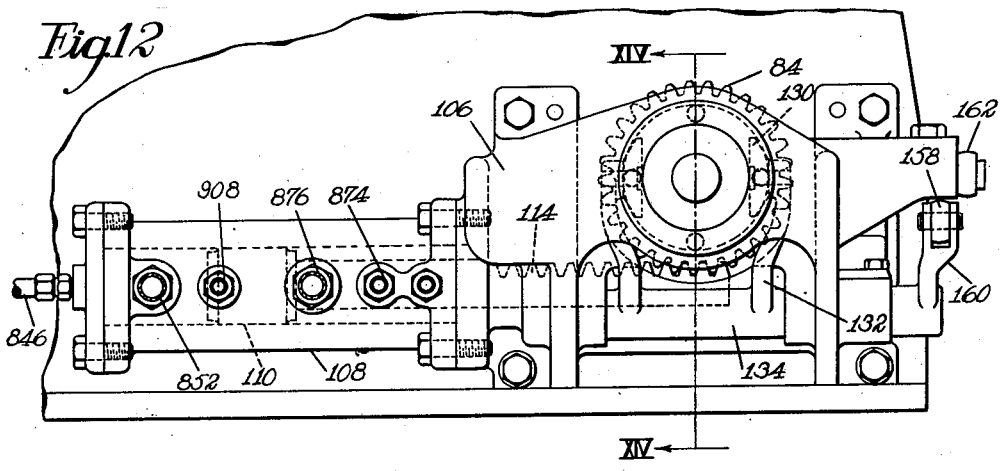
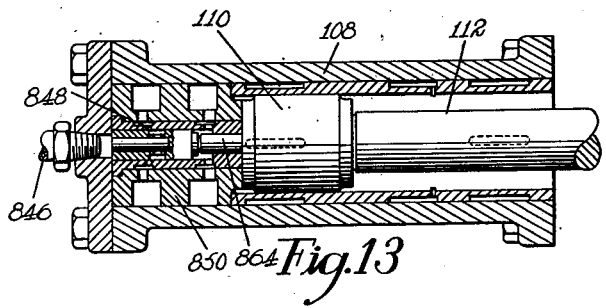
*Inventor*
William V. Goodhue
By his Attorney
Thomas J. Ryan July 5, 1949.  W. V. GOODHUE  2,474,975
GUN-LOADING MECHANISM
Filed May 11, 1944   24 Sheets-Sheet 7

Inventor
William V. Goodhue
By his Attorney
Thomas J. Ryan

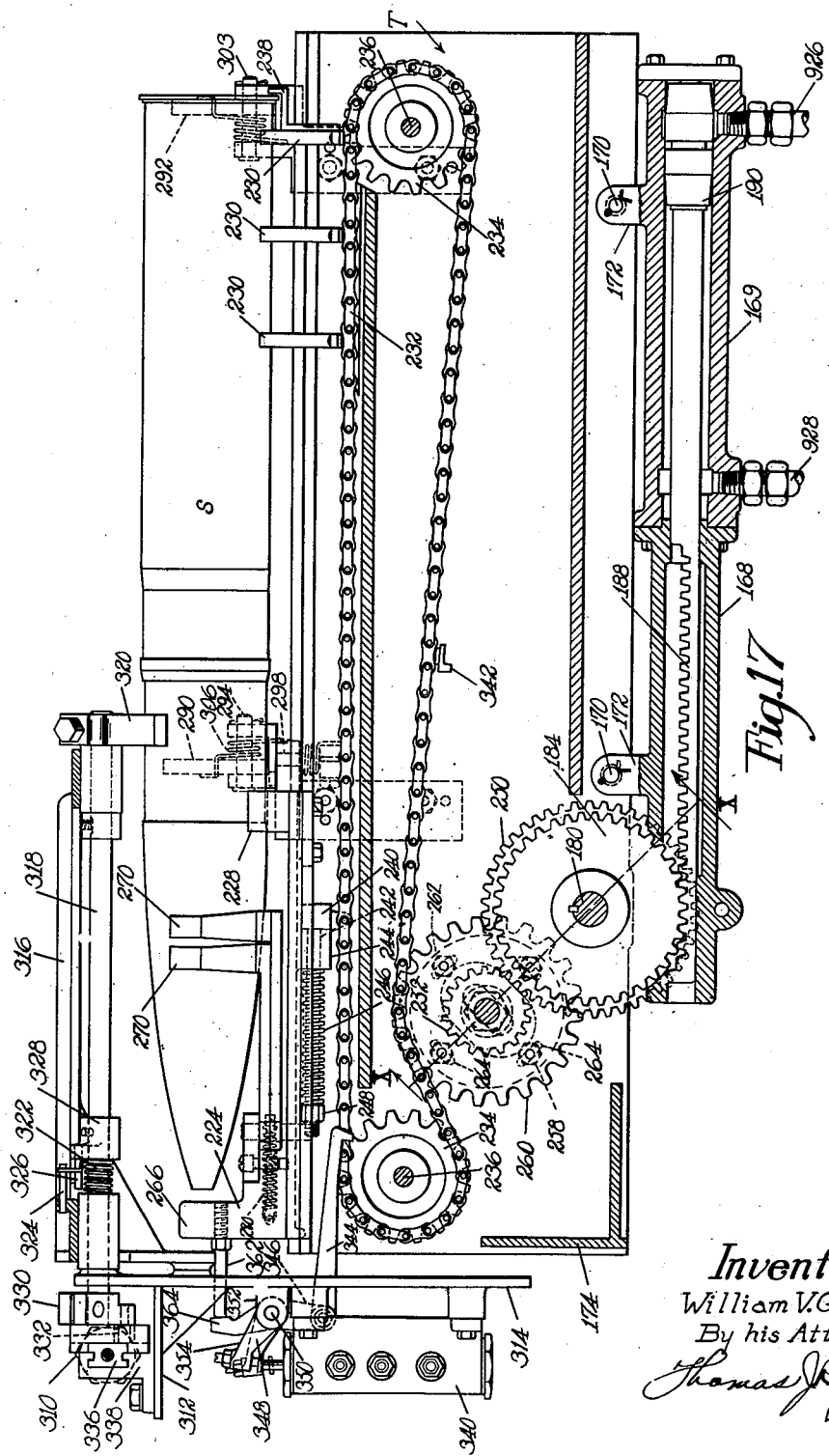

July 5, 1949.  W. V. GOODHUE  2,474,975
GUN-LOADING MECHANISM
Filed May 11, 1944  24 Sheets-Sheet 9
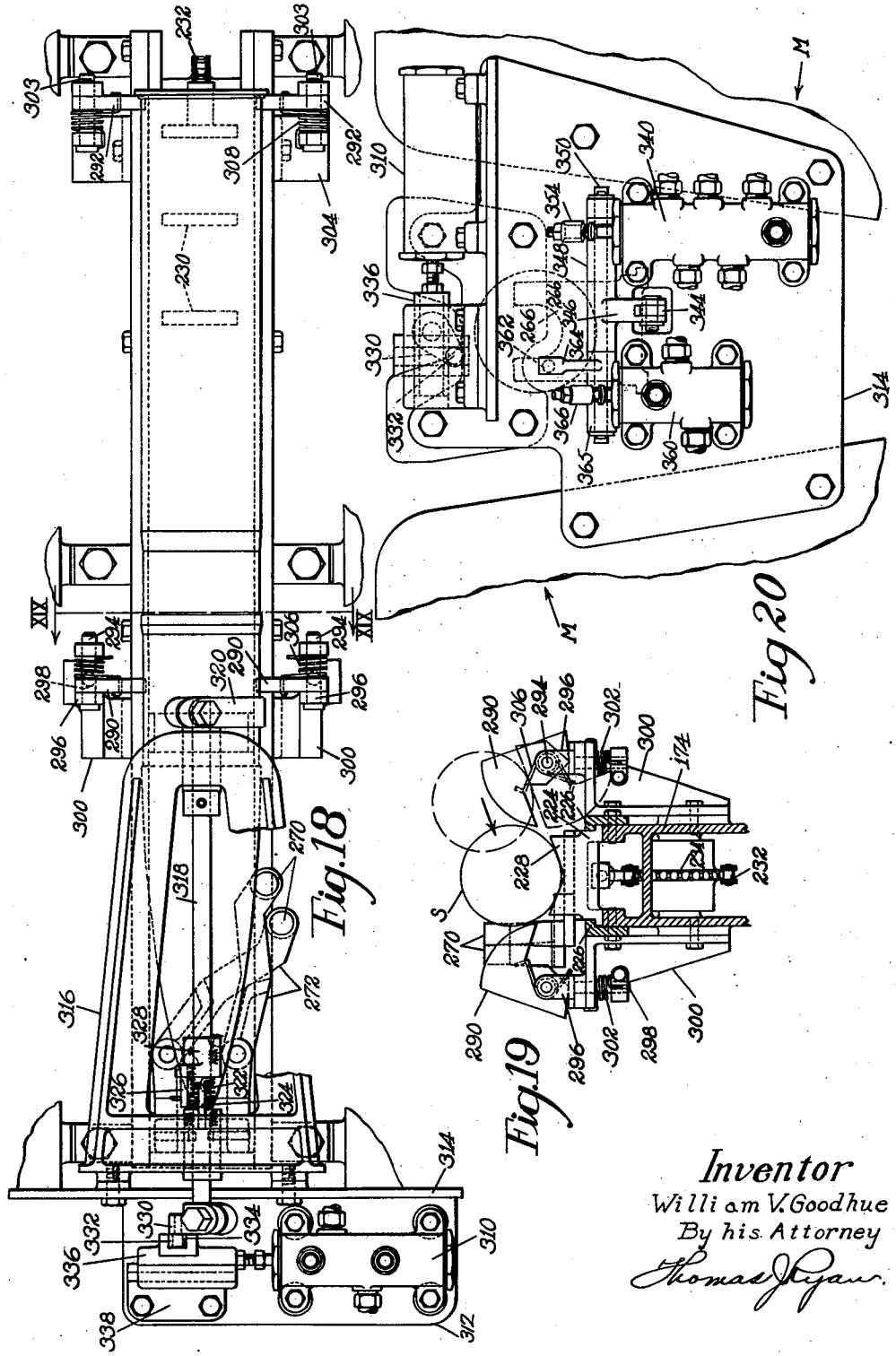
Inventor
William V. Goodhue
By his Attorney
Thomas J. Ryan July 5, 1949.  W. V. GOODHUE  2,474,975
GUN-LOADING MECHANISM
Filed May 11, 1944  24 Sheets-Sheet 10

Inventor
William V. Goodhue
By his Attorney
Thomas J. Ryan

July 5, 1949. W. V. GOODHUE 2,474,975
GUN-LOADING MECHANISM
Filed May 11, 1944 24 Sheets-Sheet 11

Inventor
William V. Goodhue
By his Attorney
Thomas J. Ryan

July 5, 1949.  W. V. GOODHUE  2,474,975
GUN-LOADING MECHANISM
Filed May 11, 1944  24 Sheets-Sheet 12

Inventor
William V. Goodhue
By his Attorney
Thomas J. Ryan

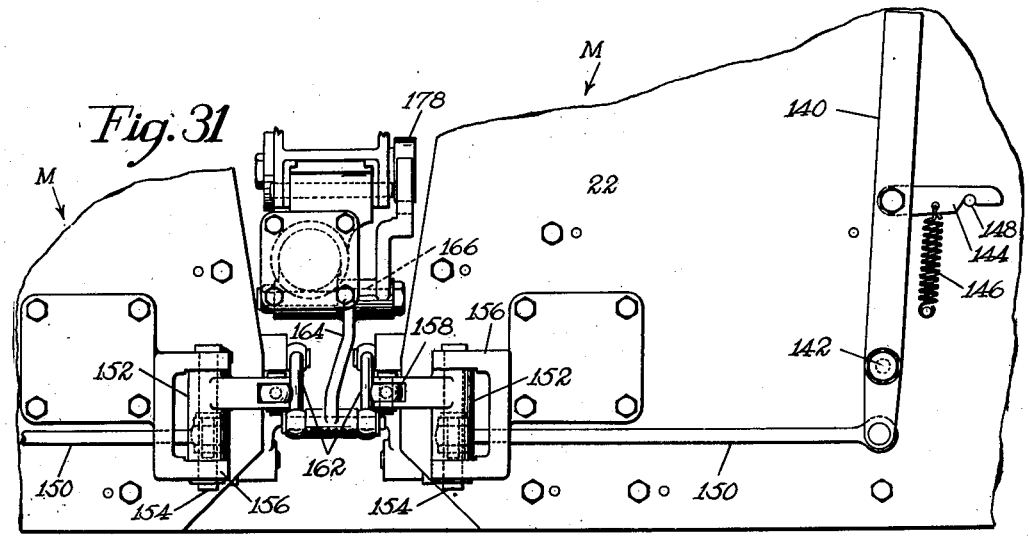
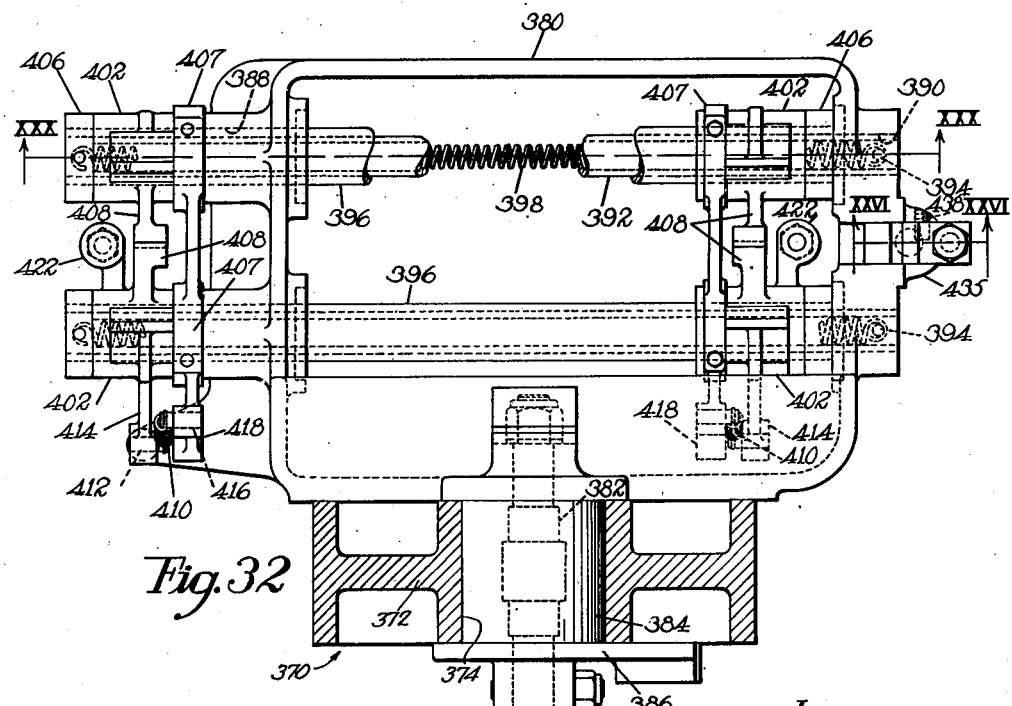

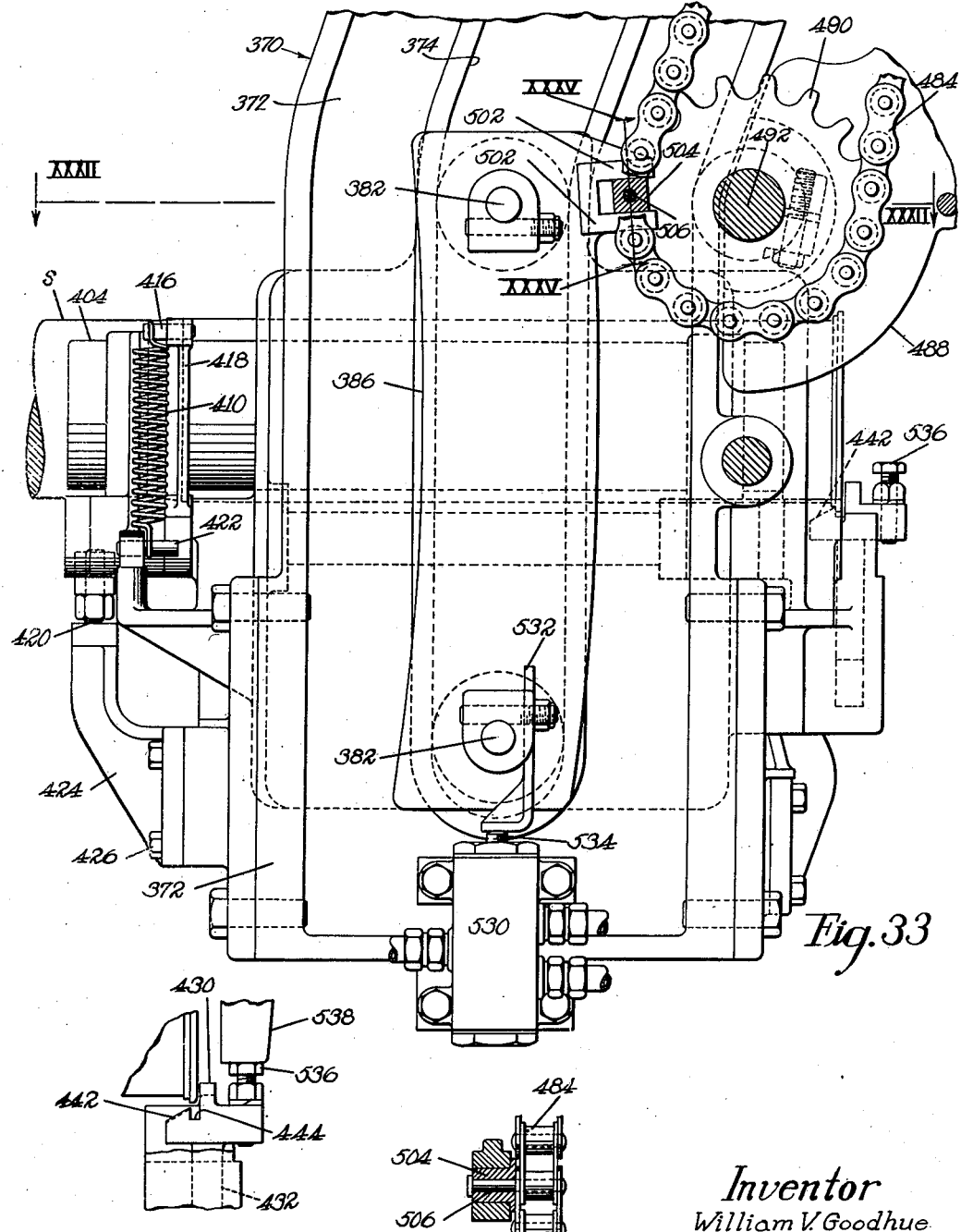

July 5, 1949.  W. V. GOODHUE  2,474,975
GUN-LOADING MECHANISM
Filed May 11, 1944  24 Sheets-Sheet 15

Inventor
William V. Goodhue
By his Attorney
Thomas J. Ryan

July 5, 1949. W. V. GOODHUE 2,474,975
GUN-LOADING MECHANISM
Filed May 11, 1944 24 Sheets-Sheet 16

Inventor
William V. Goodhue
By his Attorney
Thomas J. Ryan

Inventor
William V. Goodhue
By his Attorney
Thomas J. Ryan

July 5, 1949.　　　W. V. GOODHUE　　　2,474,975
GUN-LOADING MECHANISM
Filed May 11, 1944　　　24 Sheets-Sheet 18
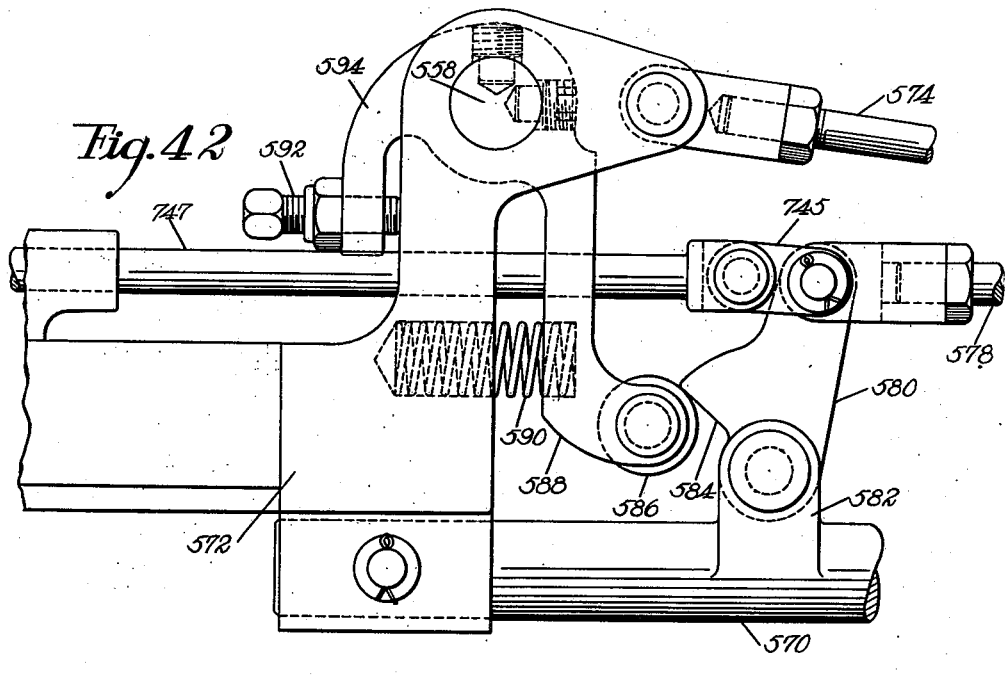
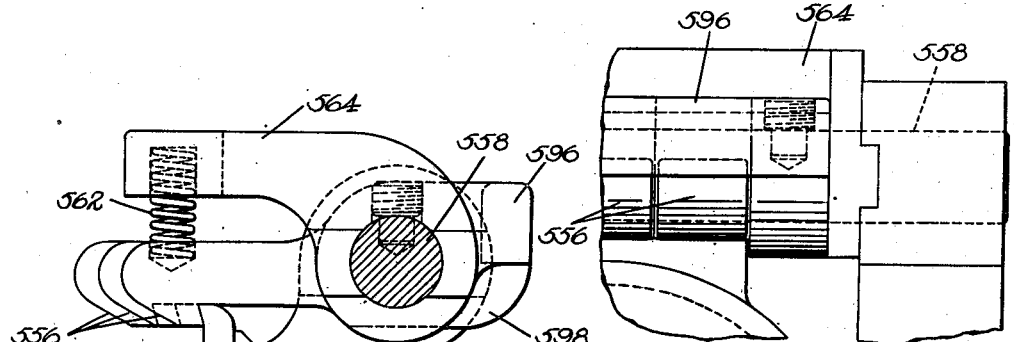
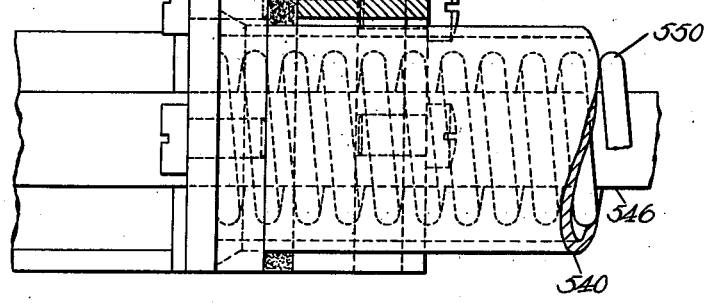
Inventor
William V. Goodhue
By his Attorney
Thomas J. Ryan July 5, 1949.     W. V. GOODHUE     2,474,975
GUN-LOADING MECHANISM
Filed May 11, 1944                     24 Sheets-Sheet 19
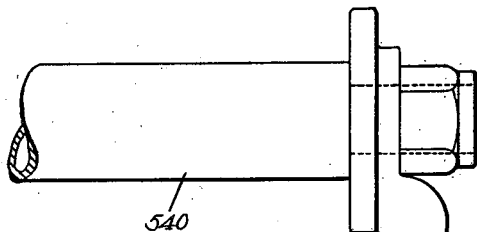
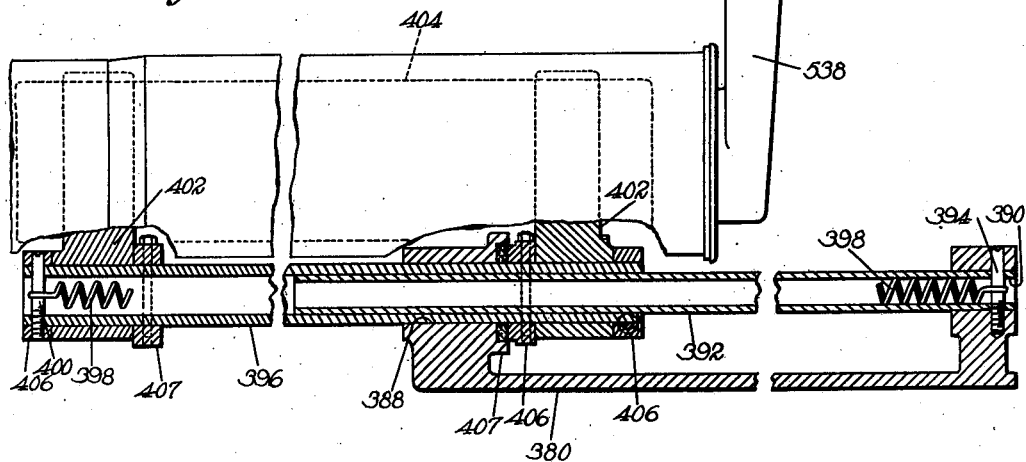
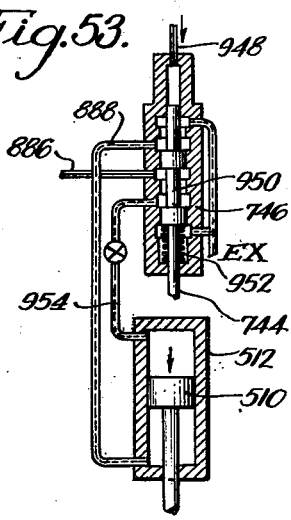
Inventor
William V. Goodhue
By his Attorney
Thomas J. Ryan

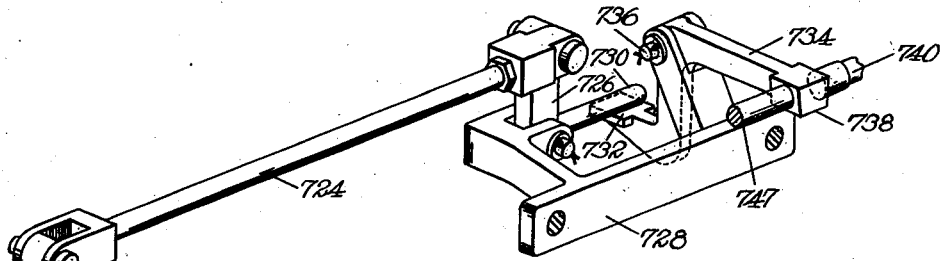

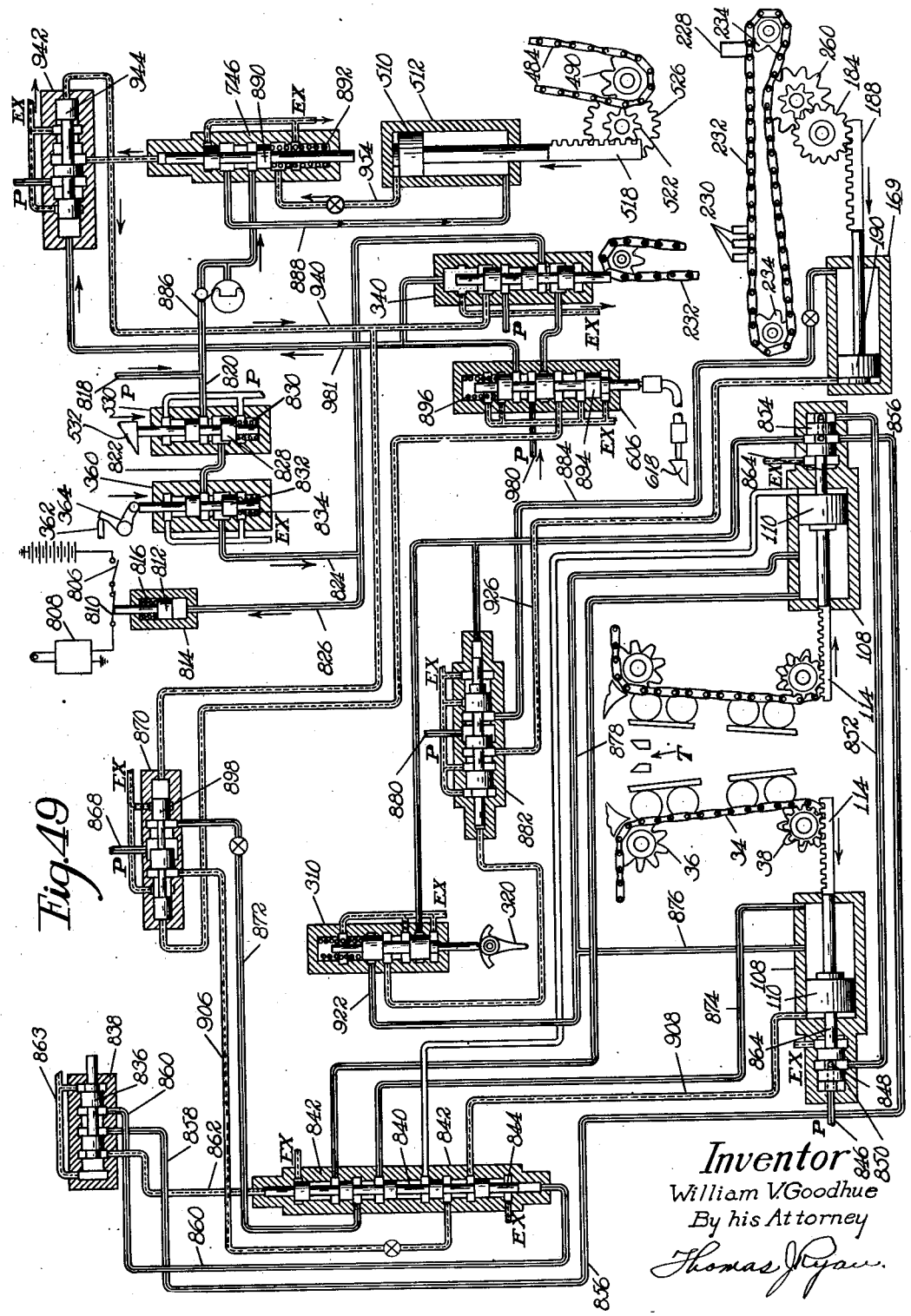

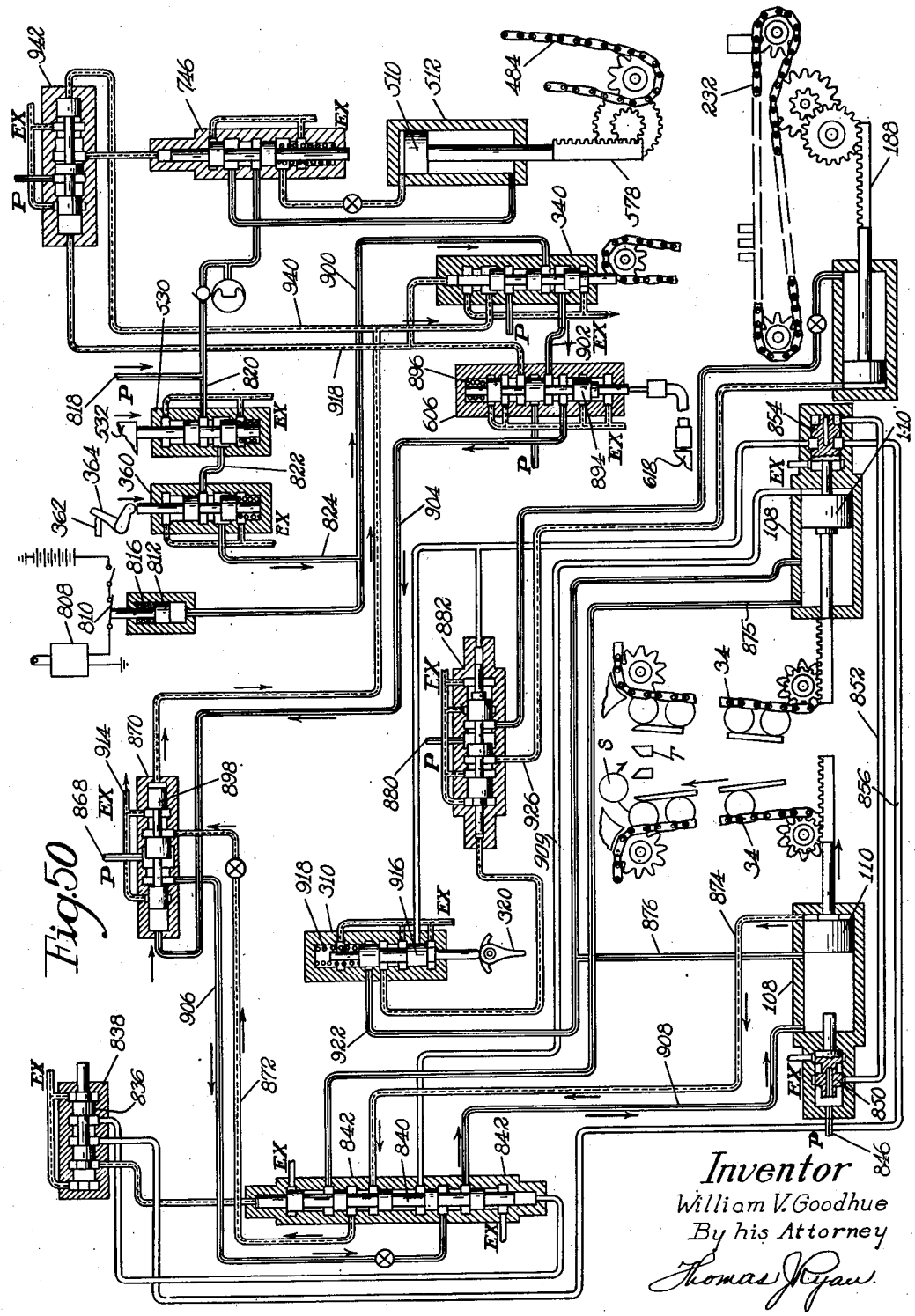

July 5, 1949.    W. V. GOODHUE    2,474,975
GUN-LOADING MECHANISM

Filed May 11, 1944    24 Sheets-Sheet 23

Inventor
William V. Goodhue
By his Attorney
Thomas J. Ryan

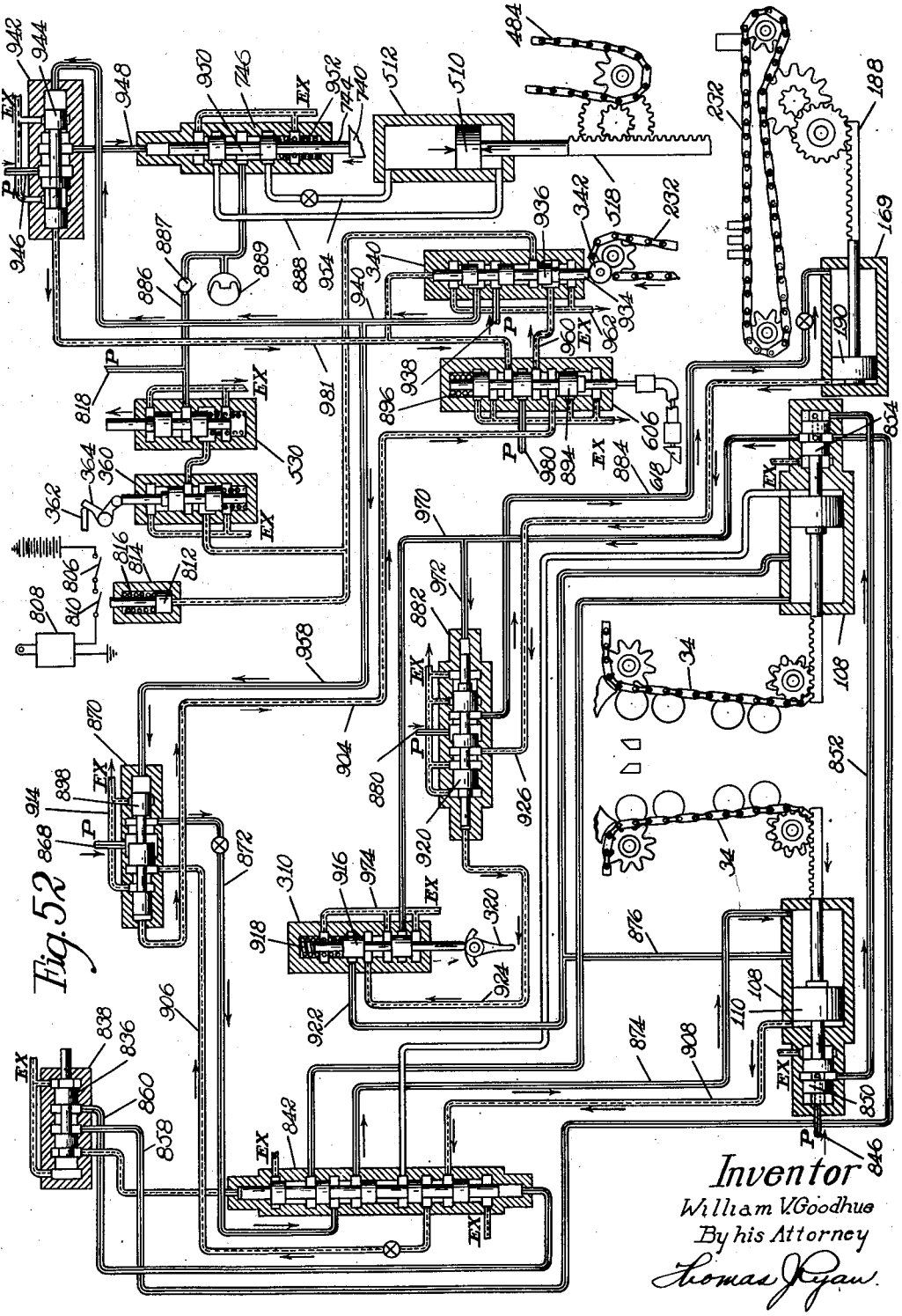

Patented July 5, 1949

2,474,975

UNITED STATES PATENT OFFICE 2,474,975

GUN-LOADING MECHANISM

William V. Goodhue, Ipswich, Mass., assignor to United Shoe Machinery Corporation, Flemington, N. J., a corporation of New Jersey Application May 11, 1944, Serial No. 535,138

18 Claims. (Cl. 89—33)

This invention relates to gun-loading mechanisms and more particularly to mechanisms for automatically loading guns of large caliber. The invention is illustrated as embodied in a mechanism for loading shells into a gun mounted in the turret of an armored tank. By the use of the mechanism disclosed herein, the personnel required in the turret is reduced by at least one, while increasing the rate of fire of the gun.

Depending upon the nature of the target it may be desirable to fire either armor piercing or high explosive shells from the gun. Accordingly, it is an object of the present invention to provide mechanism by which either type of shell may be automatically loaded into the gun at any time. To this end and in accordance with a feature of the invention, a pair of shell magazines are provided, one containing armor piercing shells and the other containing high explosive shells, and mechanism for indexing shells in one or the other of the magazines at the will of the operator and for transferring a shell therefrom into alinement with the bore of the gun and ramming it into the gun. The indexing of the shells, as herein illustrated, is initiated in response to the firing of the gun and provision is made for preselecting which magazine is to deliver a shell following the firing operation.

In accordance with a further feature of the invention, each of the shell magazines comprises a casing having a delivery opening in an upper portion thereof and a series of shell supports arranged one above another in the casing. The shells are moved automatically in opposite directions along successive supports by an endless conveyor which carries the shells downwardly through the casing and then elevates them in a vertical compartment arranged at one side of the casing into register with the delivery opening. Mechanism is arranged adjacent to the delivery opening for ejecting the shells from the magazine as they move into register with the opening, the ejecting mechanism being operated by the conveyor by which the shells are indexed. The magazines are located in the lower portion of the turret below the gun and forwardly of the breech end. In order to move the shells from the magazine into position to be rammed into the gun the shells are fed from the magazines onto a transfer tray which moves rearwardly of the gun to carry the shells onto a loader located rearwardly of the breech end of the gun. The shells are then elevated by the loader into alinement with the bore of the gun and are then rammed into the gun. Provision is made for arresting the upward movement of the loader automatically when it is in a position corresponding to that of the gun in elevation so that for any position of the gun the shells will be brought into alinement therewith for the ramming operation.

The loader, in the construction shown, moves along a curved track, the center of curvature of which coincides with the trunnions about which the gun is mounted for movement in elevation thereby to maintain the proper alinement of the shell with the gun when the shell is in ramming position. In accordance with a further feature of the invention, the loader includes a pair of curved plates engageable with opposite sides of the shell and a latch engageable with the flange of the shell so that the shell is maintained in a fixed position in the loader during its movement into ramming position. The curved shell-engaging plates are automatically retracted when the loader is in the shell-receiving position and the latch is automatically retracted upon movement of the loader into ramming position thereby to permit axial movement of the shell from the loader into the gun by the rammer.

In order to support the shell adequately as it is being moved by the rammer into the gun, and in accordance with still another feature of the invention, the shell-supporting portion of the loader is movable with respect to the other portion of the loader lengthwise of the gun and is normally maintained in a position rearwardly of the breech end of the gun by a spring. During the ramming movement, the shell-supporting portion of the loader moves with the shell until the nose of the shell is entering the breech end of the gun.

With the exception of the rammer, all of the shell-handling mechanisms are operated by fluid pressure mechanisms in a predetermined sequence. The indexing mechanism is operated automatically in response to the firing of the gun and the movement of a shell from the magazine onto the transfer tray operates a valve to cause movement of the tray rearwardly to carry the shell onto the loader. At the end of the rearward movement of the transfer tray, the loader is automatically operated and elevates the shell into ramming position, whereupon the rammer, which is spring operated, is released to carry the shell into the gun.

In accordance with a further feature of the invention, means are provided to prevent fouling of any of the mechanisms and to insure that the various shell-handling mechanisms are in their proper positions during various stages of the cycle of operations. To this end, the firing mechanism of the gun is rendered inoperative unless the loader and the transfer tray are both in their shell-receiving positions, inasmuch as the firing of the gun initiates the indexing of one of the magazines as previously determined by the operator by positioning a selector valve. The return movement of the loader into shell-receiving position is controlled by the rammer after it has carried the shell into the gun. Consequently, if the shell is not properly rammed, the loader is not returned, and the firing mechanism cannot be operated. To prevent ramming a shell into the gun in the event that a previously fired shell case has not been properly and completely ejected from the gun, provision is made for preventing operation of the loader until the previously fired shell case has been properly ejected.

The above and other features of the invention, including various novel details of construction and combinations of parts, will be now described in detail by reference to the accompanying drawings and pointed out in the claims.

In the drawings,

Fig. 7 is a plan view partly in section of one of the shell magazines;

Fig. 8 is an end elevation of the kicker mechanism by which shells are ejected from the magazine onto the transfer tray and of means for manually indexing the shells to load the magazine;

Fig. 11 is a view in end elevation of the kicker mechanism associated with one of the magazines illustrating the position that the parts assume upon ejecting a shell from the magazine and depositing it on the transfer tray;

Fig. 12 is a front elevation of one of the magazine-indexing mechanisms;

Fig. 13 is a section through the fluid pressure mechanism for indexing one of the magazines;

Fig. 17 is a vertical section through the shell transfer mechanism illustrating a shell positioned thereon;

Fig. 18 is a plan view of the shell transfer mechanism;

Fig. 19 is a section on the line XIX—XIX of Fig. 18;

Fig. 20 is a front elevation of the shell-transfer mechanism;

Fig. 31 is a rear elevation of a portion of the shell magazines illustrating the means for manually throwing out the clutches for the indexing means to permit loading of the magazines;

Fig. 32 is a plan view partly in section of the loader, the section being taken along the line XXXII—XXXII of Fig. 33;

Fig. 33 is a side elevation partly in section of the lower portion of the loader guide track showing the loader in its shell-receiving position;

Fig. 34 is a side elevation of the shell-locking means associated with the loader, the locking means being in its released position to permit the ramming of the shell;

Fig. 35 is a section on the line XXXV—XXXV of Fig. 33;

Fig. 42 is a side elevation of a portion of the mechanism for operating the valve which controls the upward movement of the loader;

Fig. 43 is a section on the line XLIII—XLIII of Fig. 38 illustrating the latches for holding the rammer in cocked position;

Fig. 44 is a left end elevation of a portion of the mechanism shown in Fig. 43;

Fig. 45 is a vertical section through the loader showing the position the parts assume during the ramming operation;

Figs. 46, 47 and 48 are perspective views of different portions of the safety mechanism operated by ejection of the shell;

Fig. 49 is a diagram of the fluid pressure system for operating the various mechanisms, this view showing parts in the positions they assume when the gun is loaded and ready to fire;

Figs. 50, 51, 52 are similar views showing the position of the parts at various stages in the cycle of operation; and Fig. 53 is a view of a portion of the fluid pressure system showing the parts in the positions assumed at another stage in the cycle of operations.

Figure 1:
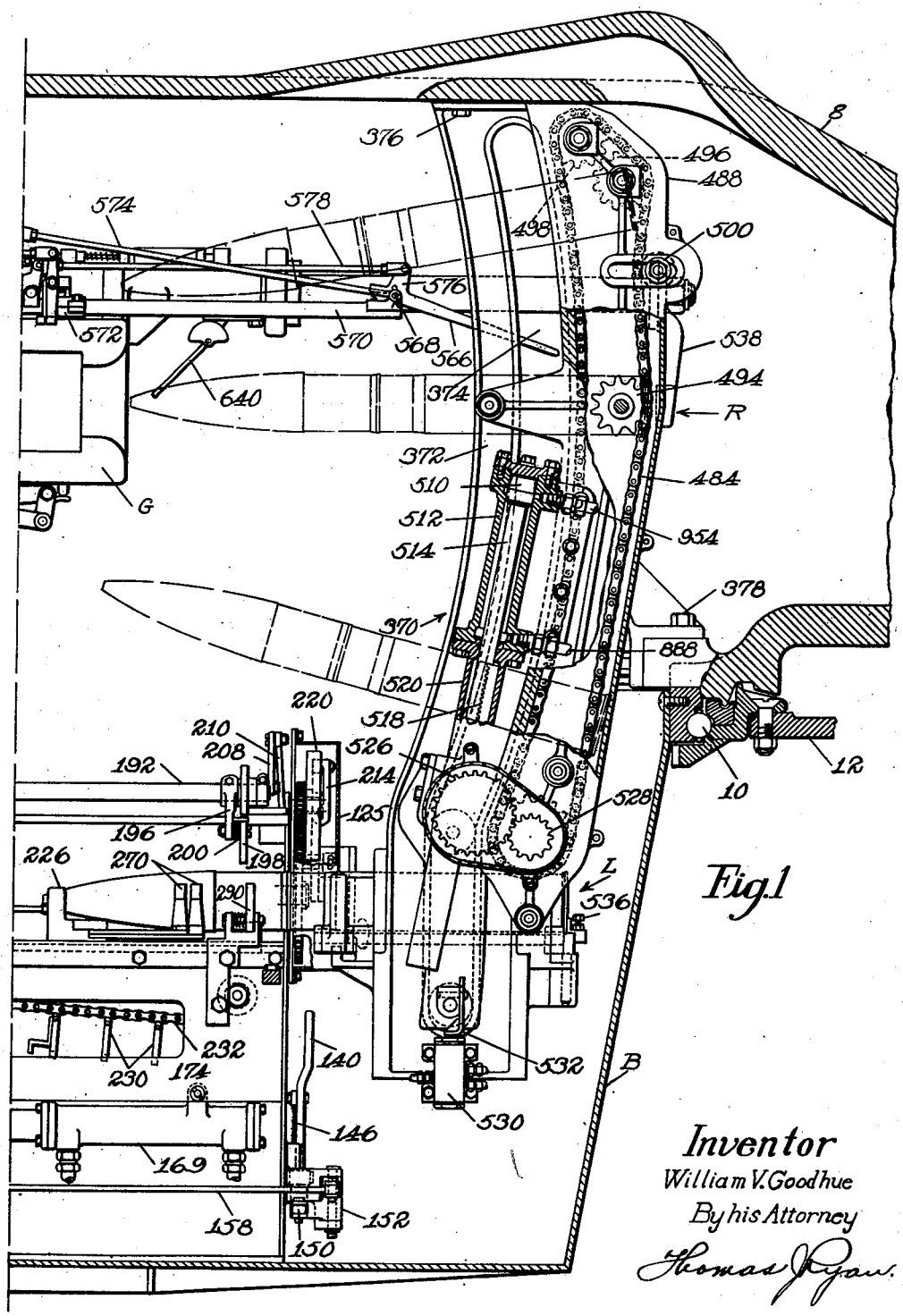
Fig. 1 is a vertical section through the rear part of a tank turret illustrating a portion of one form of mechanism in which the invention is embodied.

The invention is illustrated herein as embodied in a shell-loading mechanism for a tank gun G (Figs. 1 and 2) mounted in a turret 8 journaled for movement about a vertical axis by bearings 10 carried by the body 12 of the tank. Secured to and depending from the turret is a basket B providing a support for most of the loading mechanism and for the operator. The turret is provided with an opening 14 in its front wall to which is secured a face plate 16 in which the gun is journaled on trunnions 18 for movement in elevation. Movement of the gun in azimuth is afforded by the rotatable mounting of the turret on the tank.

Figure 2:
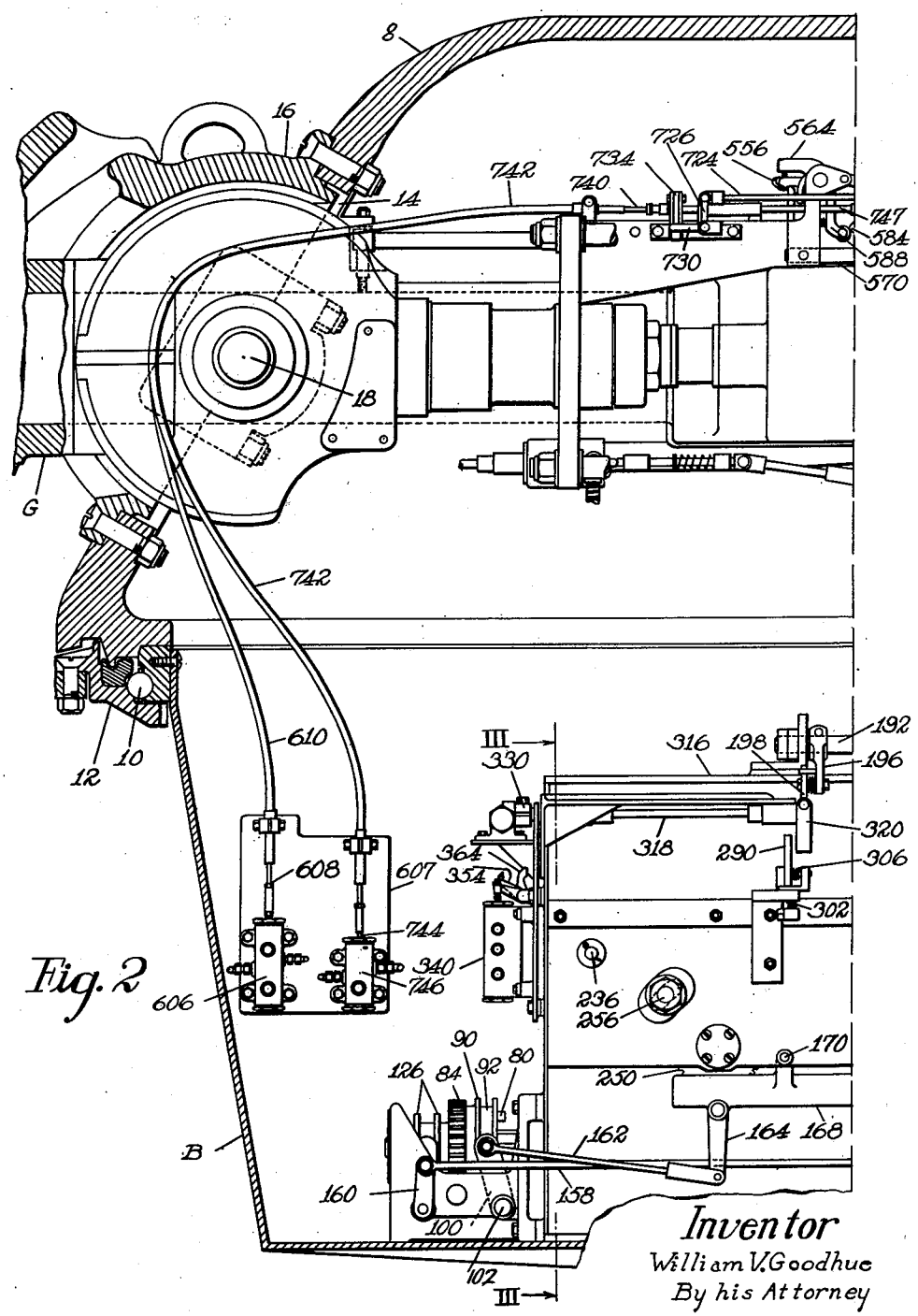
Fig. 2 is a vertical section through the forward part of the tank turret illustrating another portion of the mechanism.

Carried by the floor of the basket B below and at the opposite sides of the breech end of the gun is a pair of shell magazines M (Fig. 3), providing a supply of ammunition for the gun. The provision of two shell magazines enables the supplying of different kinds of ammunition to the gun at the will of the operator by preselecting which magazine is to feed the next succeeding shell, as will be explained. Thus one magazine may contain high explosive shells and the other may contain armor piercing shells. Shells are ejected from one or the other magazines onto a transfer tray T by means of kicker mechanisms K associated with each magazine. After a shell has been deposited upon the transfer tray the tray carries the shell rearwardly of the breech of the gun and deposits it on a loader L movable vertically in a guide track until the shell has been elevated into alinement with the bore of the gun as illustrated in Fig. 1. Upon reaching this position a rammer R forces the shell into the gun after which the breech closes, the transfer tray and loader return to their original positions and the gun is ready to be fired upon actuation of a firing button by the operator.

Figure 3:
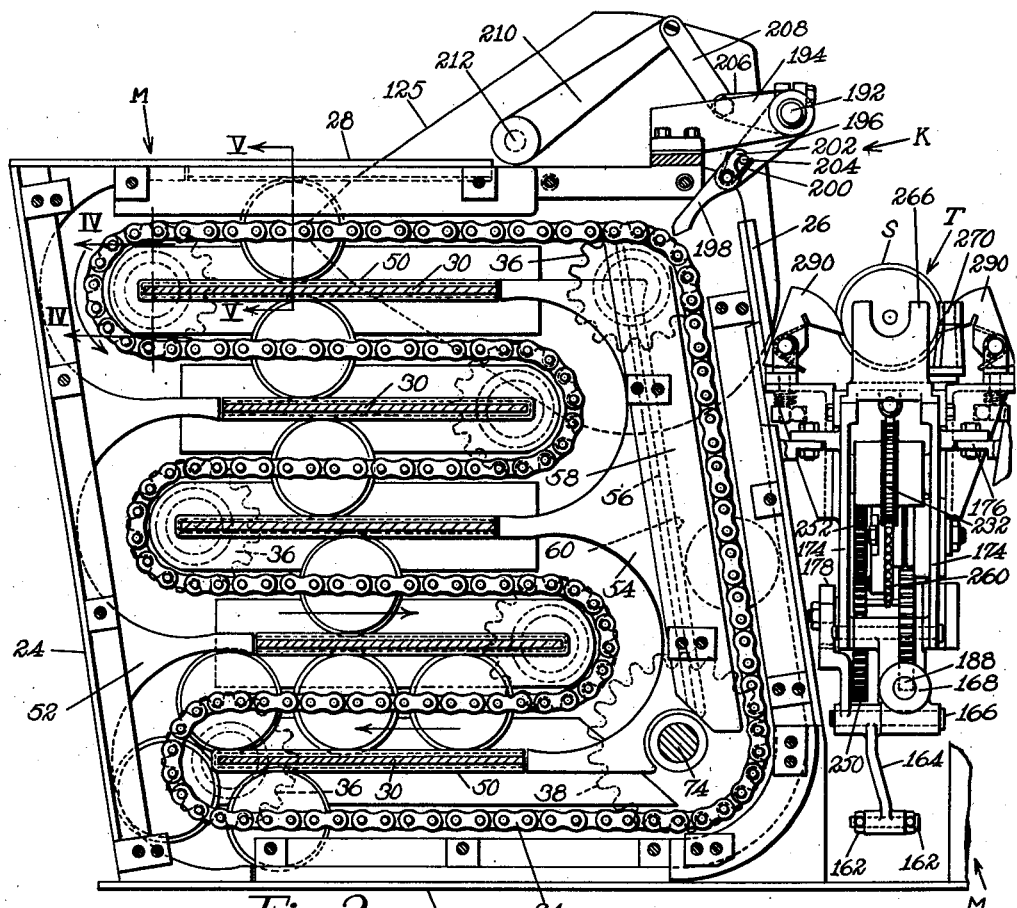
Fig. 3 is a vertical transverse section through one of the shell magazines on the line III—III of Fig. 2 and a front elevation of the shell transfer mechanism and the driving means therefor.
Figures 4, 5, 6:
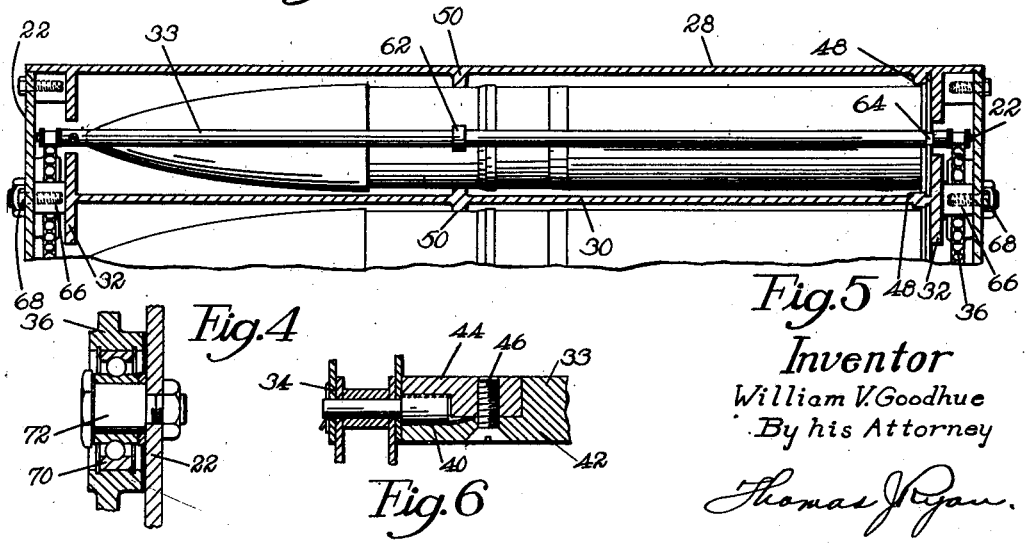
Fig. 4 is a section on the line IV—IV of Fig. 3.
Fig. 5 is a section on the line V—V of Fig. 3.
Fig. 6 is a section through one of the magazine drive chains showing means for connecting the shell-separating rods thereto.

As best illustrated in Figs. 3 and 5, the magazines each comprise a bottom wall 20, end walls 22, side walls 24, 26 and a top wall or cover 28. The side walls 24 and 26 are parallel but incline upwardly and outwardly thereby to conform to the tapered walls of the basket B, while affording the maximum capacity for shells. Each magazine is divided into several compartments by horizontal partitions 30, provided at their front and rear ends with vertical walls 32 (Fig. 5). The vertical walls of the adjacent partitions 30 are spaced from each other to permit the passage of the ends of rods 33 which serve to space the shells from each other and to drive the shells in the direction of the arrows (Fig. 3) through the magazine. These rods are secured at their ends to sprocket chains 34 carried by sprockets 36 and operated by a drive sprocket 38 as will be described. For securing the rods 33 to the sprocket chains, the pins connecting the links of the chains at the locations where the rods are to be secured extend inwardly as indicated in Fig. 6 to provide bearings 40 for the hollow ends of the rods 33. One end of each rod is made of two parts 42 and 44 as indicated in Fig. 6, secured together by a screw 46 to facilitate assembly of the rod on the chain. When the chains are operated by the drive sprockets 38 the shells are moved from the top of the magazine in a zig-zag path through each compartment formed by the horizontal partitions 30 until they reach the bottom of the magazine whereupon they move upwardly along the inner wall 26 of the magazine until they are in a position to be ejected by the kicker mechanism K through a discharge opening onto the transfer tray T.

The vertical wall portions 32 of the partitions 30 at the rear of the magazine are arranged to be engaged by the back ends of the shells and ribs 48 carried by the partitions 30 engage the forward sides of the flanges thereby to prevent axial movement of the shells in the magazine. Similar ribs are carried by the top 28 and bottom wall 20 of the magazine and ribs 50 carried by the partitions and the top and bottom walls engage the projectiles which are of smaller diameter than the cartridge cases thereby to hold the shells in horizontal positions. To guide the shells as they move in a curved path from one compartment in the magazine to another, guide plates 52 and 54 forming continuations of the ribs 48 and 50 are provided. The plates 52 are carried by the side wall 24 whereas the plates 54 are carried by a wall 56 extending parallel to the wall 26, but spaced inwardly therefrom to form with the wall 26 a vertical shell compartment. The wall 56 carries end walls 58 for engagement with the back ends of the shells and ribs 60 cooperate with the adjacent wall 58 to engage the front of the flanges and prevent axial movement of the shells. A similar construction is provided on the side wall 26. The rods 33 by which the shells are driven have collars 62 engageable with the projectiles of the shells and annular grooves 64 into which fit the flanges at the ends of the shells. The vertical walls 32 of the horizontal partitions 30 are separated from the end walls 22 of the magazine by bosses 66 on the walls 32, threaded to receive screws 68 by which the partitions are secured between the end walls. The spaces between the walls 32 and the end walls 22 form compartments for the sprocket chains and the sprockets, the latter of which are carried by bearings 70 (Fig. 4) mounted on studs 72 secured to the end walls 22.

Figure 16:
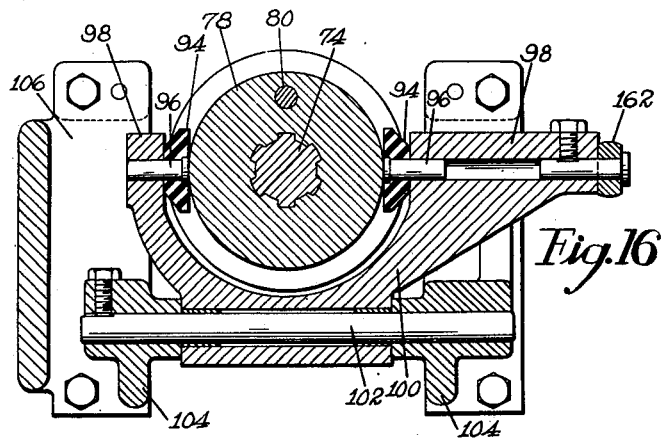
Fig. 16 is a section on the line XVI—XVI of Fig. 14.
Figure 21:
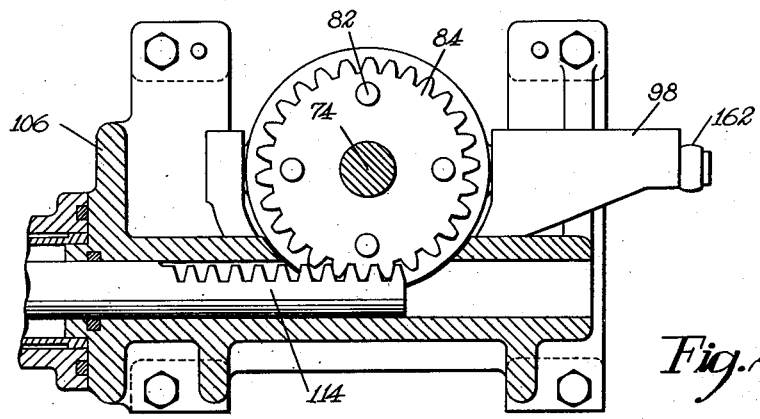
Fig. 21 is a section on the line XXI—XXI of Fig. 14.

The drive sprockets 38 are secured to a drive shaft 74 (Fig. 14) journaled in bearings 76 carried by the end walls 22 of the magazine. This shaft extends forwardly of the magazine and is splined to receive a clutch member 78 carrying a pin 80 projecting outwardly of the member 78 at opposite sides. With the clutch member 78 in the position shown in Fig. 14, the pin 80 is received by a hole 82 in a drive pinion 84 rotatable on the outer end of the shaft 74 thereby to connect the pinion to the shaft. With the member 78 moved toward the right the pin 80 is withdrawn from the pinion 84 so that the pinion is no longer able to drive the shaft and the opposite end of the pin 80 enters an aperture 86 in a plate 88 surrounding the shaft 74 and secured to the front wall 22 of the magazine thereby to lock the shaft against rotation. For shifting the clutch member 78 along the shaft 74 the clutch member is provided with a pair of flanges 90 providing between them a groove 92 for the reception of a pair of shoes 94 (Fig. 16) carried by pins 96 in the upper ends of arms 98 of a clutch shifter 100 journaled on a pin 102 extending between walls 104 of a support 106 secured to the front wall 22 of the magazine. The means for operating the clutch shifter will be described later.

Figure 14:
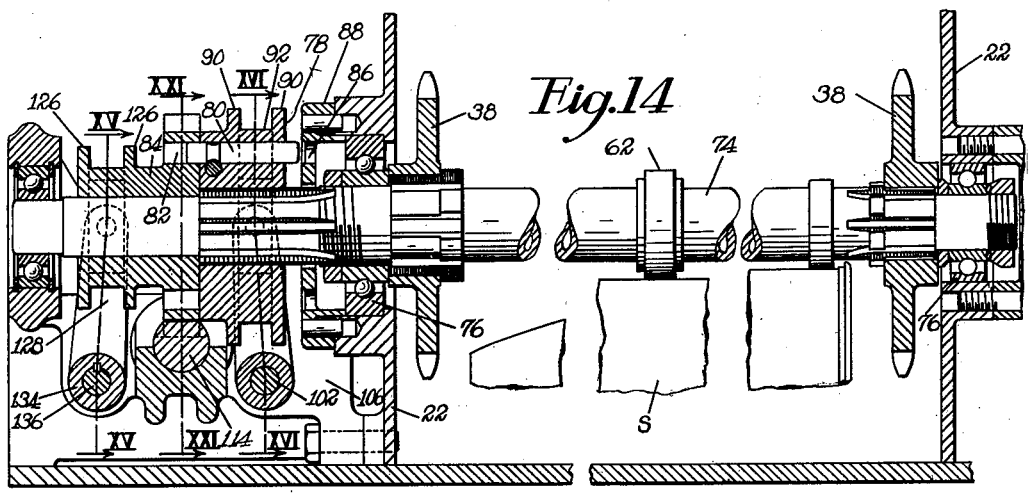
Fig. 14 is a section on the line XIV—XIV of Fig. 12.
Figure 15:
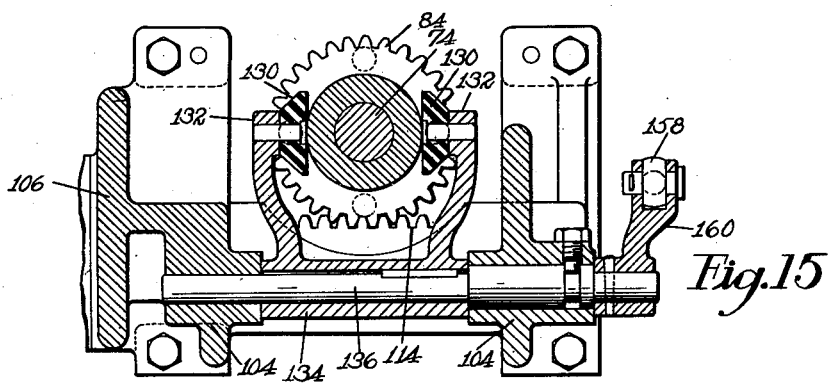
Fig. 15 is a section on the line XV—XV of Fig. 14.

Secured to the support 106 and extending laterally therefrom is a cylinder 108 (Fig. 12) housing a piston 110 having a piston rod 112 extending outwardly toward the support and formed at its outer end as a rack 114 engageable with the pinion 84 so that upon movement of the piston toward the right from the position shown in Fig. 13 the pinion 84 is turned in a counterclockwise direction as viewed in Fig. 15. If the pinion is connected by the clutch member 78 to the shaft 74 at this time, an indexing movement will be imparted to the chains 33 in the magazine. It will be understood that each magazine is provided with a driving assembly as illustrated in Fig. 14 so that by the selective admission of pressure fluid to the associated cylinders one or the other of the magazines will be indexed. After the shells in the magazine have been moved one step to carry a shell into position to be ejected onto the transfer tray the clutch member 78 is shifted to the right to disconnect the pinion 84 from the shaft 74 and to move the pin 80 into the aperture 86 of the plate 88 thereby positively to lock the shaft against rotation. Thus upon return movement of the drive piston 110 and reverse movement of the pinion 84, reverse movement will not be imparted to the drive shaft 74.

Loading of each magazine is effected manually by the operation of a crank 116 (Fig. 8) connected by gears 118, 120, 122 and 124 to the shaft carrying the sprocket 36 at the upper inner portion of the magazine. These gears are supported in a gear housing 125 secured to the rear wall of the magazine. In order to index the magazine manually it is necessary that the drive shaft 74 be unlocked by movement of the clutch member 78 to the position shown in Fig. 14 but it is also necessary that the pinion 84 be free of the shaft 74 in view of its connection to the rack 114. Accordingly the pinion 84 is slideable on the shaft and is provided with spaced flanges 126 forming a groove 128 for the reception of shoes 130 carried at the upper ends of arms 132 of a shifter 134 keyed to a shaft 136 journaled in the walls 104 of the support 106. Upon rocking the shaft 136 in a counterclockwise direction as viewed in Fig. 14, the pinion 84 is moved out of engagement with the pin 80 of the clutch member 78 so that the pinion is free of the shaft but the shaft is free to be turned upon operation of the crank 116 to permit manual indexing of the magazine. It will be noted in Fig. 3 that the cover plate 28 of the magazine terminates short of the side wall 26 to provide a space through which the shells may be inserted.

Figure 9:
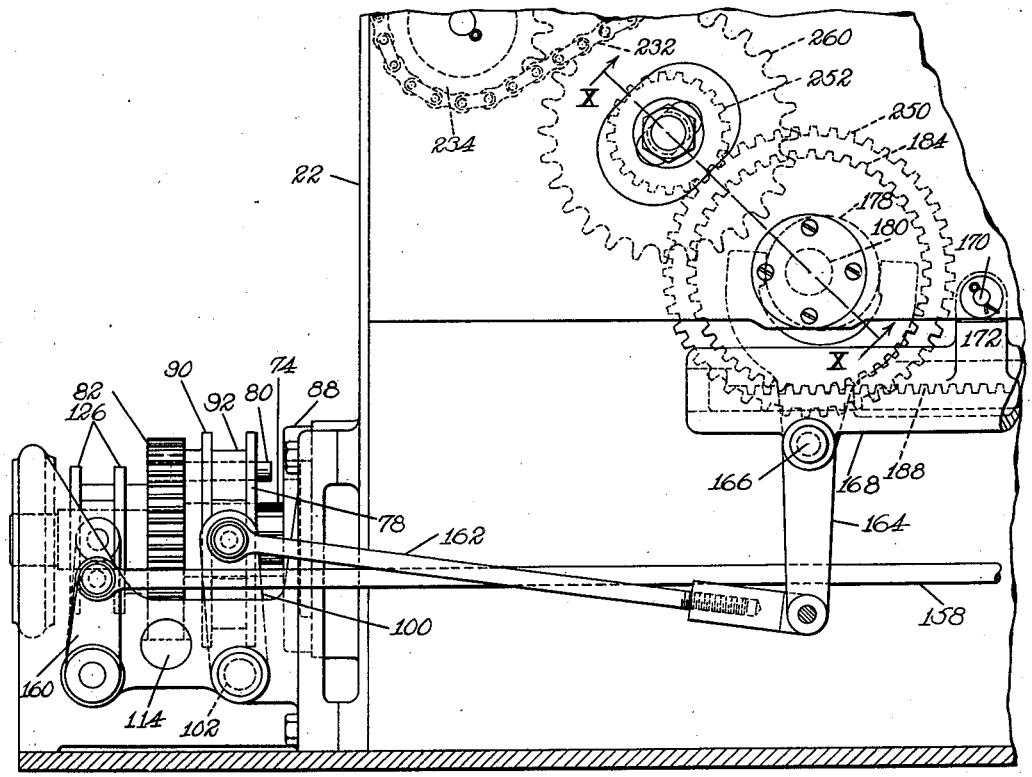
Fig. 9 is a view in side elevation illustrating the clutch mechanism for controlling the magazine drive and a portion of the mechanism for driving the shell-transfer tray.

Operation of the shifter 134 is effected by a lever 140 (Figs. 1 and 31) pivoted at 142 to the rear wall 22 of the magazine and normally held in the position shown in Fig. 31 by a notched arm 144 urged by a spring 146 into locking engagement with a pin 148 in the wall 22. The lower end of the lever 140 is connected by a link 150 to an arm of a bell crank lever 152 journaled on a vertical pin 154 carried by a bracket 156 on the rear wall 22. The other arm of the bell crank lever is connected by a forwardly extending link 158 (Figs. 9 and 15) to an arm 160 extending upwardly from and pinned to the shaft 136. From the above it will be seen that as the lever 140 (Fig. 31) is moved in a counterclockwise direction the pinion 84 is shifted out of engagement with the clutch member 78 so that the drive shaft 74, while being free to turn, is also free of the drive pinion 84 permitting the magazine to be indexed manually during the loading thereof.

Figure 10:
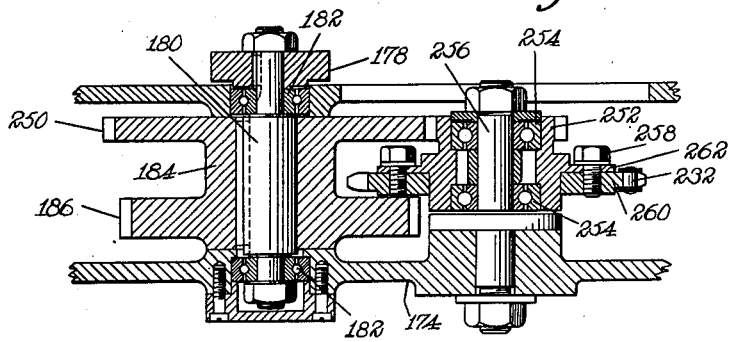
Fig. 10 is a section on the line X—X of Fig. 9.

The clutch member 78 (Fig. 14) is automatically shifted to the right to disconnect the drive shaft 74 from the pinion 84 at a predetermined time in the indexing of the shells in the magazine. For this purpose the member 98 which shifts the clutch member 78 is connected by a link 162 (Fig. 9) to the lower end of a lever 164 pivoted at 166 to the under side of a housing 168. This housing and a cylinder 169 to which it is secured (Fig. 17) are suspended by means of pins 170 and ears 172 from the lower portions of spaced walls of a gear housing 174 (Fig. 3). The housing 174 is carried by brackets 176 projecting inwardly from the adjacent side walls 26 of the magazines. The upper end of the lever 164 is bifurcated and engages opposite sides of an eccentric 178 keyed to a shaft 180 journaled in bearings 182 (Fig. 10) carried by the vertical walls of housing 174. Keyed to the shaft between the walls is a pinion 184 having a set of teeth 186 meshing with a rack 188 formed at the outer end of the rod of a piston 190 (Fig. 17) slidable in the cylinder 169. Upon the admission of pressure fluid to the rear end of the cylinder, the rack 188 moves to the left as viewed in Fig. 9, whereupon the eccentric 178 moves to rock the lever 164 in a counterclockwise direction thus moving the clutch member 78 out of engagement with the pinion 82 and locking the drive shaft 74 against further rotation. The rack 188 is also utilized to operate the transfer tray to carry the shell rearwardly onto the loader as will be described. The operation of the transfer tray starts immediately after the termination of the indexing of the shells in the magazine. It will be noted in Fig. 3 that the lever 164 is connected to two links 162 there being one for controlling the driving mechanism for each magazine.

After a shell has been indexed into position at the top of each magazine, to be moved onto the transfer tray, the kicker mechanism K (Figs. 3 and 8) is operated. This mechanism comprises a shaft 192 journaled in brackets 194, secured to the upper portion of the magazine and carrying a pair of spaced depending arms 196. Pivoted to the lower end of each arm is a finger 198 urged by a torsion spring 200 into alinement with the arm 196. The finger is held in this position by a rearward extension 202 engageable with a pin 204 carried by the arm. Secured to the shaft 192 is an arm 206 connected by a link 208 to an arm 210 to the lower end of which is secured one end of a rod 212, the other end of which is connected to an arm 214 (Figs. 8 and 11) carrying a cam roll 216. This roll is received in a groove 218 of a cam 220 rotatable with a gear 222 in the gear housing 125 meshing with the gear 124 on the shaft carrying the sprockets 36 at the upper inner corner of the magazine. As the magazine is indexed, the sprocket chain 34 drives the sprocket 36, rotating the gears 124, 222 and the cam 220, thereby moving the fingers 198 from the position shown in Fig. 8 into the position shown in Fig. 11. This movement of the fingers carries the shells as indicated in Fig. 11 out of the magazine, depositing them on the transfer tray after which the fingers 198 return to their retracted positions as shown in Figs. 3 and 8. During this return movement the fingers engage the shell which is being indexed into the transfer position but are able to ride over the shell by reason of the pivotal connection between them and the arms 196 by which they are carried. Thus the fingers snap over the top of the shell and return to their straightened positions as shown in Figs. 3 and 8. Inasmuch as the fingers are operated by the sprocket chain 34, they operate in time relation to the indexing of the shells through the magazine. It will be understood that a similar kicker mechanism is provided for the other shell magazine. So that the kicker mechanisms will not eject shells while the magazines are being manually loaded, the crank 116 is turned in a direction to move the shells through the magazine in the opposite direction to that in which they are indexed during loading of the gun.

Figure 22:
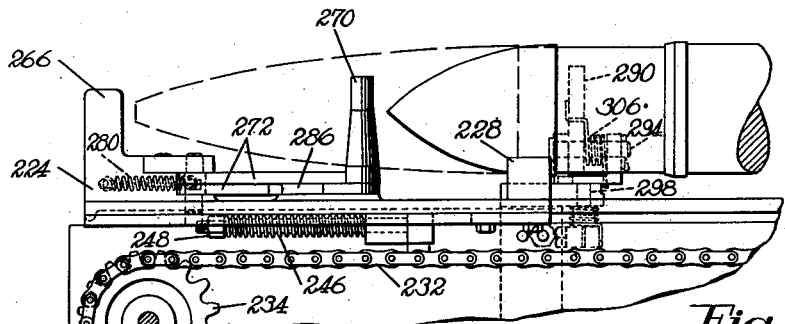
Fig. 22 is a side elevation of a portion of the transfer tray illustrating the positions assumed by the nose of an armor piercing shell and the nose of a high explosive shell.

The transfer mechanism is mounted in the upper portion of the gear housing 174 and comprises a slide 224 (Figs. 17, 19 and 22). This slide is movable in ways formed between the upper portion of the housing 174 and flanged plates 226 (Fig. 19) secured to the opposite sides of the housing. The slide includes a support 228 arranged for engagement by the projectile of a shell when positioned to be transferred to the loader. The rear portion of the shell is carried by three supports 230, secured to a chain 232 carried by sprockets 234 mounted on shafts 236 secured between the side walls of the housing 174. The slide 224 and the supports 230 form a transfer tray by which the shell is transported to the loader. To the rearmost support 230 is secured an abutment 238 engageable with the rearward end of the shell S to prevent rearward movement of the shell on the transfer tray until the shell is moved at least partially onto the loader. The slide 224 is secured to the chain and moves therewith during operation of the chain to carry the shell onto the loader. For this purpose a member 240 is secured to and projects upwardly from the chain and carries a bolt 242 which extends forwardly through a boss 244 projecting downwardly from the slide 224. A spring 246 is held between the boss 244 and a nut 248 on the outer end of the bolt 242 thereby providing a yieldable connection between the chain 232 and the slide. This permits slight movement of the chain with respect to the slide after the shell has been transferred into position on the loader.

The chain 232 is driven by the piston 190 when the clutch 78 (Fig. 9) is operated to interrupt the indexing of the magazine. The pinion 184 (Fig. 10) carries a second set of teeth 250 engageable with a pinion 252 journaled on bearings 254 on a shaft 256 carried by one of the walls of the housing 174. Adjustably secured to the pinion 252 by screws 258 is a sprocket 260 engageable with the chain 232 for driving the same. The screws pass through slots 264 (Fig. 17) of a flange 262 integral with the pinion 252 so that the angular position of the sprocket with respect to the pinion 252 may be adjusted thereby to adjust the timing of the chain 232.

Figure 23:
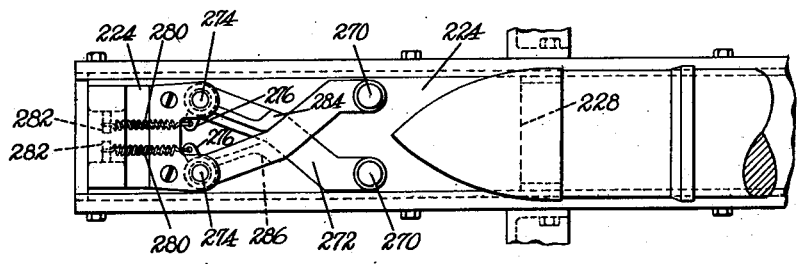
Fig. 23 is a plan view of the forward portion of the transfer tray illustrating an armor piercing shell thereon.

The transfer tray is designed for accommodating shells of different lengths inasmuch as high explosive shells are commonly of greater length than an armor piercing shell of the same caliber. In order to insure that the shell is carried into the proper position on the loader a member 266 (Fig. 17) projects upwardly from the forward portion of the slide 224 and is arranged to engage the nose of the shell should the slide move rearwardly a short distance with respect to the shell thereby to insure movement of the shell with the slide. This member 266 is positioned as indicated in Figs. 17 and 22 for engagement with the nose of a long shell upon slight movement of the slide with respect thereto. The high explosive shell is indicated by broken lines in Fig. 22 and the short armor-piercing shell is indicated in full lines and it will be noted that the nose of the latter shell lies a considerable distance rearwardly of the member 266. Accordingly, a pair of vertically disposed fingers 270 are positioned to engage the nose of the short shell. These fingers are carried by a pair of crossed arms 272 pivoted on pins 274 carried by the slide 224. Ears 276 extend inwardly from the arms 272 and are connected by springs 280 to pins 282 on the slide. These springs urge the arms 272 outwardly of each other to maintain the pins 270 in spaced relation as shown in Fig. 23. The extent of this movement of the arms is limited by an upwardly extending shoulder 284 on one arm and a downwardly extending shoulder 286 on the other arm. By this arrangement it will be seen that the outer ends of the arms carrying the pins 270 can not be moved farther apart than is shown. The pivotal mounting of the arms permits the pins to be moved out of the way upon loading a long shell upon the transfer mechanism as indicated in Figs. 17 and 18. Assume a long shell is to be carried onto the tray from the right hand side, looking forwardly as viewed in Fig. 18. The pin 270 first engaged by the long shell will be moved with its arm against the force exerted by the spring 280 and its engagement with the abutment 286 of the other arm causes that arm to be moved outwardly of the transfer tray so that the arms and pins assume the position shown in Fig. 18. Should a long shell be loaded from the other side of the tray it will be apparent that the pins and arms will move in the opposite directions but in either event they will not interfere with the movement of a long shell on the transfer tray.

For guiding the shells as they are moved onto the transfer tray and for centering the shells thereon, two sets of lugs, 290 and 292, Figs. 17, 18 and 19, engageable with the projectile and the rearward portions of the shell respectively are provided. These lugs are all shaped as indicated in Fig. 19, the lugs 290 being pivoted on pins 294 carried by brackets 296 which have downwardly projecting pins 298 providing for movement of the lugs about vertical axes. These pins pass through brackets 300 secured to the upper portion of the gear housing 174. Torsion springs 302 maintain the supporting brackets 296 for the lugs normally in positions in which the lugs are normal to the axis of the shell. The mounting of the lugs for pivotal movement about vertical axes permits the lugs to be swung out of the way by the pins 270 on the transfer slide as the slide is moved rearwardly to carry the long shell thereon onto the loader. These pins do not move rearwardly as far as the lugs 292 which therefore are not mounted for movement about vertical axes but are mounted for movement about horizontal axes on pins 303 carried by brackets 304 secured to the rearward portion of the gear housing. The lugs 290 and 292 are normally maintained in the full line positions shown in Fig. 19 by torsion springs 306 and 308 respectively. During the loading of a shell, as indicated in Fig. 19 the lugs on that side of the transfer mechanism from which the shell is being loaded are depressed into the broken line positions so that the rearward portions of the lugs which are straight, form a slideway for guiding the shell into position on the transfer tray. After the shell is properly positioned thereon the lugs are returned by their torsion springs into the full line positions thereby maintaining the shell properly centered on the transfer tray.

The operation of the transfer mechanism is initiated by the shell upon its movement into position on the supports 228 and 230. This is effected by the operation of a valve 310 (Figs. 17 and 18) carried by a bracket 312 secured to a vertical plate 314 fastened to the front of the shell magazines as shown in Fig. 20 and extending across the space between them. Secured to the rear portion of the plate is a support 316 for a rearwardly extending shaft 318 provided at its rearward end with a depending arm 320 arranged to be engaged by the shell as it moves into position on the transfer tray. The shaft 318 is normally held by a torsion spring 322 in a position with the arm 320 extending vertically downward. The spring 322 acts between a pin 324 carried by the support 316 and a pin 326 extending forwardly from a collar 328 secured to the shaft 318. Upon movement of a shell onto the transfer mechanism, the shaft 318 will be rocked in one direction or the other by the engagement of the shell with the arm 320, the direction of movement of the shaft depending upon the magazine from which the shell is introduced. The shaft 318 extends forwardly of the support 316 and carries at its outer end a crank 330 having a crank pin 332 movable in a vertical slot 334 in a slide 336 guided for horizontal movement in a slideway formed in a flanged plate 338 secured to the bracket 312. The slide 336 is connected to the element of the valve 310 causing the valve to move in a direction to initiate operation of the transfer mechanism irrespective of the direction of rotation of the shaft 318 by the shell. The operation of this valve will be described in detail in connection with the other fluid-pressure-operated mechanisms as the description proceeds.

Secured to the front of the plate 314 is a valve 340 which is arranged to be actuated automatically after the shell has been properly deposited upon the loader thereby to initiate operation of the loader. For this purpose the chain 232 (Fig. 17) carries a lug 342 engageable with a downwardly extending projection of an arm 344 after the chain has been moved a predetermined extent. This arm is pivoted at its forward portion to a depending arm 346 of a lever 348 fulcrumed on a pin 350 carried by brackets 352 extending forwardly of the plate 314. This lever includes a second arm 354 engageable with the top of the stem of valve 340 so that upon counterclockwise movement of the lever, as viewed in Fig. 17, the valve stem is depressed against the action of a detent tending to maintain it in its raised position, as will be subsequently explained. Accordingly, after the chain 232 is operated through a sufficient distance to cause movement of the shell onto the loader, the lug 342 engages the rearward end of the arm 344 moving it rearwardly and thereby causing movement of the lever 348 in a counterclockwise direction to operate the valve 340 and initiate operation of the loader. This operation of the valve 340 also causes return of the indexing piston 110 to its original position after which the pressure is applied to the forward side of the piston 190 and the transfer tray is returned to its shell-receiving position, as will be more fully explained.

After the transfer mechanism has been returned to its initial position, the member 266 carried by the slide 224 operates a valve 360 also secured to the front of the plate 314 (Fig. 20). The member 266 carries a forwardly extending pin 362 engageable with an upwardly extending arm 364 of a bell crank lever 365 pivoted on the shaft 350, the other arm 366 of this lever engaging the upwardly extending stem of valve 360. Accordingly when the parts are returned to the positions shown in Fig. 17 the pin 362 operates the bell crank lever 365 to operate the valve 360 which functions in a manner to be described to interrupt the return movement of the transfer mechanism whereupon the parts come to rest in the positions shown in Fig. 17. This operation of the valve 360 is necessary before the gun can be fired, as will be explained.

After the shell has been carried rearwardly by the transfer mechanism into the position shown in Fig. 1 it is elevated by the loader into alinement with the gun. The loader is guided in its upward movement by a track 370 which comprises a guideway 372 having a slot 374 therein which is curved except at its lower portion, the center of curvature coinciding with the axis about which the gun is journaled for movement in elevation so that for any position of the gun in elevation the shell may be alined therewith. The guideway 372 is secured by screws 376 and 378 within the turret so that it moves therewith.

Figure 30:
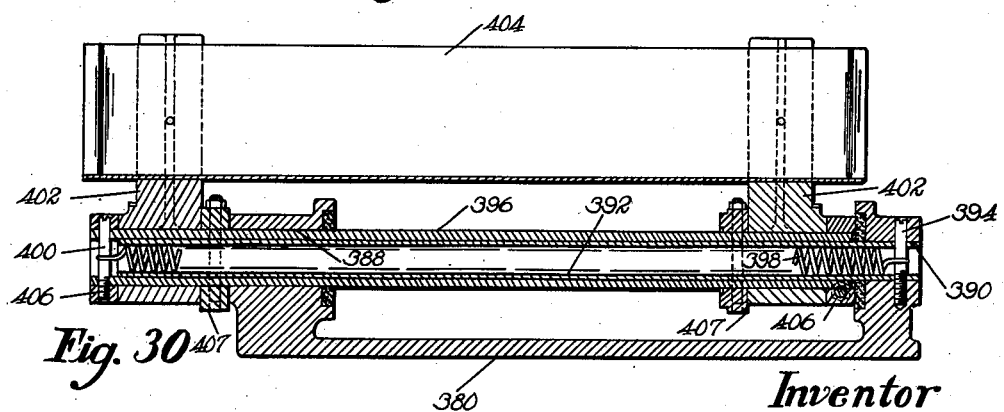
Fig. 30 is a section on the line XXX—XXX of Figs. 24 and 32.
Figure 36:
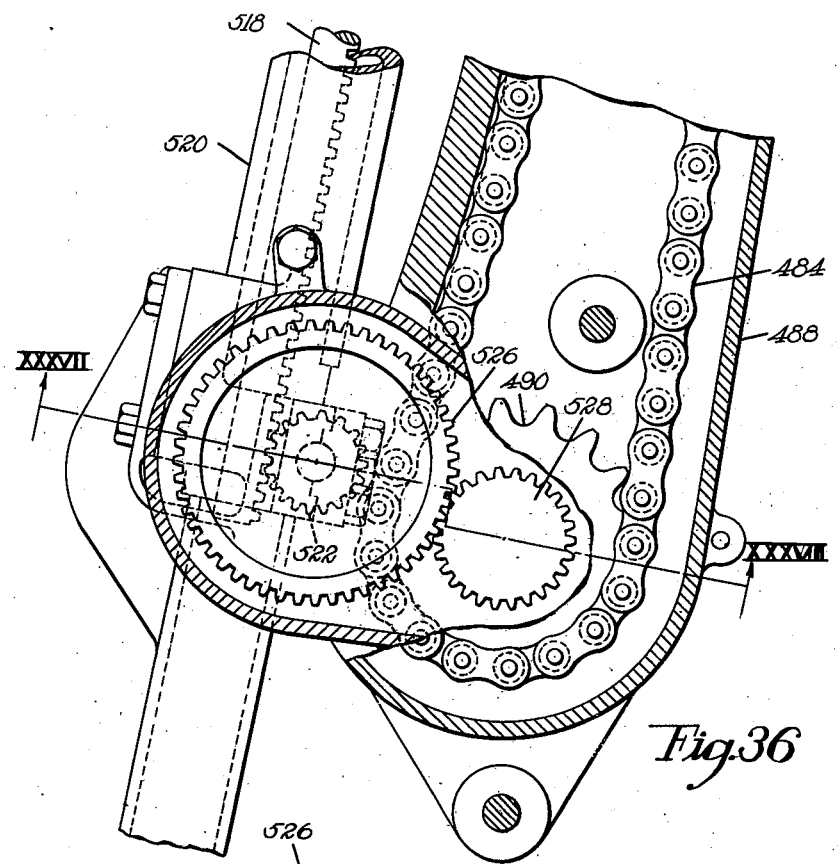
Fig. 36 is a vertical section through the loader drive mechanism.
Figure 37:
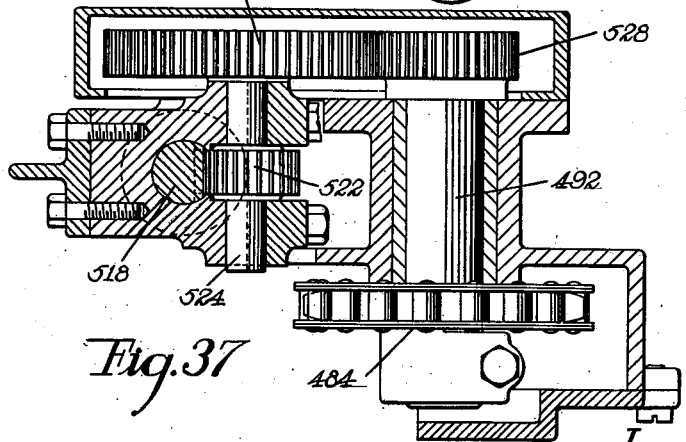
Fig. 37 is a section on the line XXXVII—XXXVII of Fig. 36.

The loader comprises a carriage 380 (Figs. 24, 30 and 32) having laterally extending pins 382 secured thereto forming journals for guide rolls 384 received in the slot 374 of the track 370. The rolls are maintained in the groove by a plate 386 (Fig. 24) engageable with the guideway 372 on the side opposite that engaged by the carriage 380 and secured to the outer ends of the pins 382. The carriage 380 is provided with vertical upwardly extending walls having pairs of alined apertures 388 and 390 (Fig. 30) in which are received supporting tubes 392 secured to the carriage by pins 394. Carried on each tube 392 is a slidable tube 396 which passes through the opening 388 which is of greater diameter than the tube 392, the outer tubes being held in the positions illustrated in Figs. 30 and 32 by springs 398 connected at one of their ends to pins 394 and at their other ends to pins 400 passing through the outer ends of the tubes 396. This arrangement permits the tubes 396 to move to the left with respect to the tubes 392 for a purpose which will appear as the description proceeds.

Figure 24:
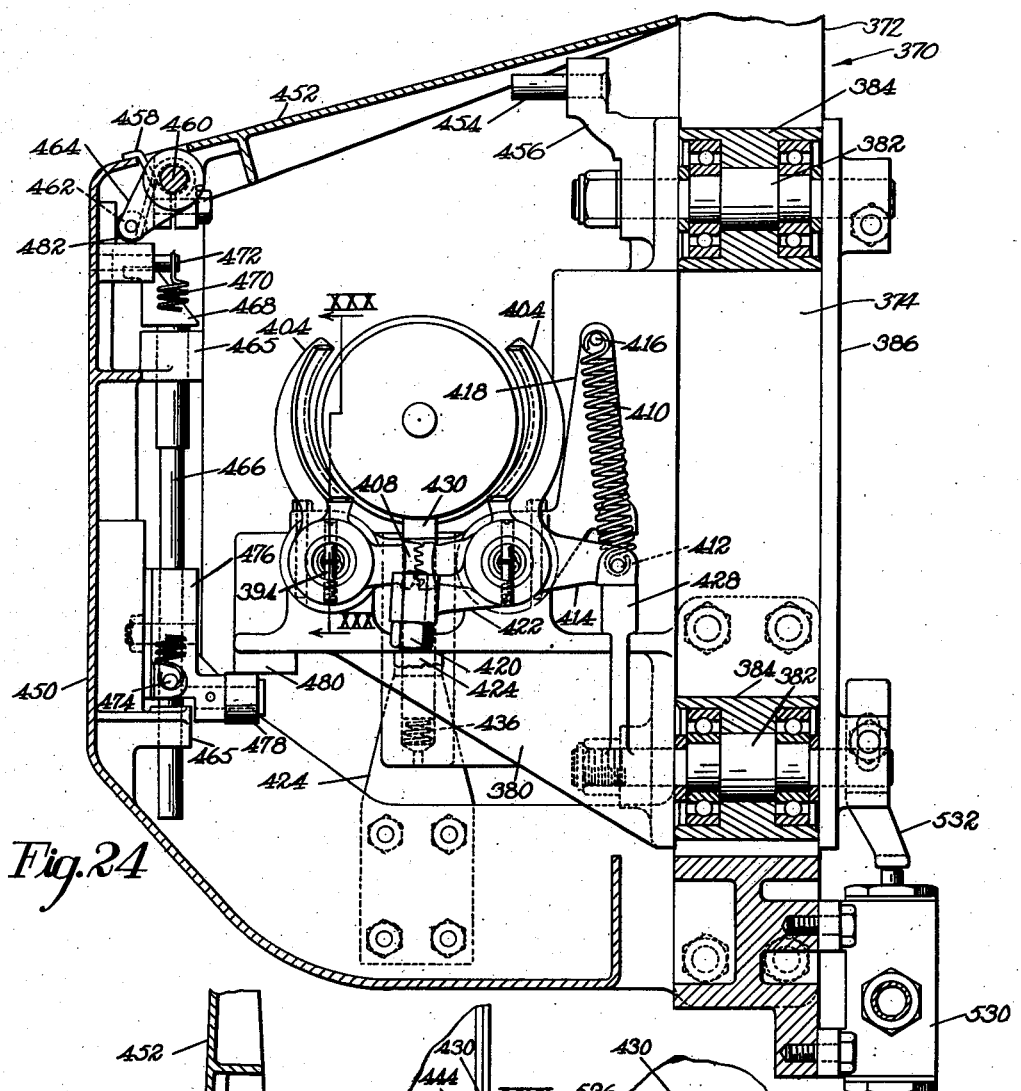
Fig. 24 is a front elevation partly in section of the lower part of the loader mechanism by which the shell is elevated into ramming position, the mechanism being shown in its down position enclosed by a casing.
Figure 28:
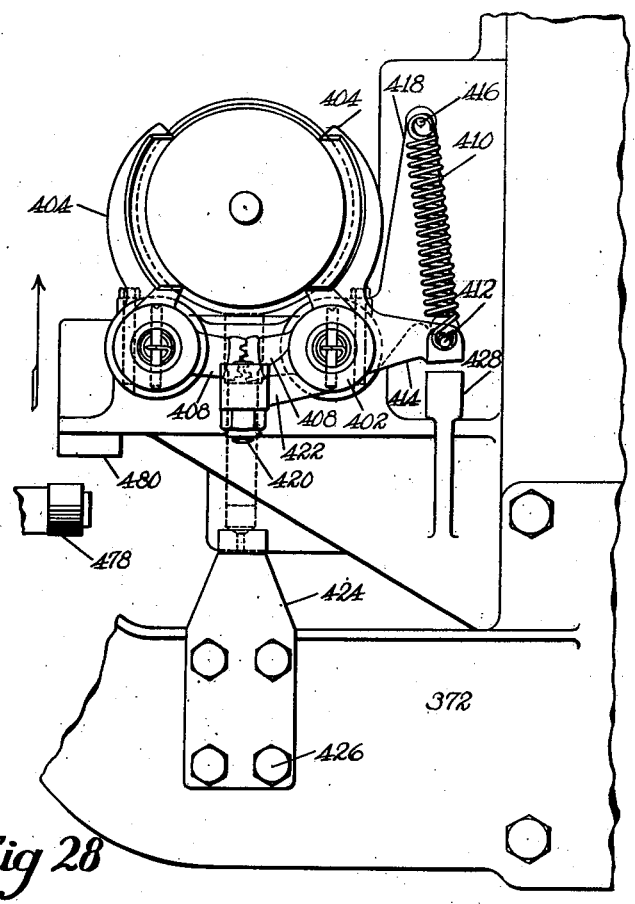
Fig. 28 is a front elevation of the loader after it has started its upward movement.

On each of the tubes 396 is mounted a pair of spaced arms 402 which support a curved retaining plate 404 engageable with one side of a shell carried by the loader. The arms 402 are held against sliding movement with respect to the tube 396 between collars 406 secured to the outer ends of the tubes and interconnected collars 407 (Fig. 32) at the inner sides of the arms 402. The arms 402 have integral therewith inwardly extending arms 408 (Figs. 28 and 32) provided at their adjacent ends with intermeshing gear teeth so that the plates 404 carried by each of the tubes are interconnected for equal and opposite movement. The plates are urged toward each other by a pair of springs 410 connected at one of their ends to pins 412 carried by arms 414 integral with the arms 402 projecting outwardly of the loader, the other ends of the springs being connected to pins 416 carried by projections 418 extending upwardly from the collars 407. When the loader is in its down position to receive a shell from the transfer mechanism the shell-retaining plates are held apart against the force of the springs 410 by the engagement of stop screws 420 carried by the outer ends of arms 422 integral with the arms 402 with stops 424 secured by screws 426 to the lower portion of the guideway 372. The extent to which the plates are opened is limited by a stop 428 engageable with the outer end of the arm 414 as shown in Fig. 24. As the loader starts to move upwardly the stop screw 420 moves out of engagement with the stop 424 as indicated in Fig. 28 whereupon the spring 410 moves the plates inwardly against the sides of the shell to hold the shell in the loader.

Figures 26, 27:
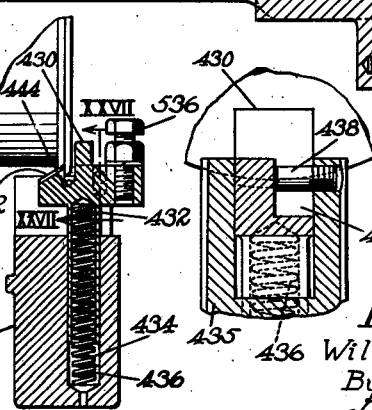
Fig. 26 is a vertical section through the means for locking the shell in the loader against endwise movement, this section being taken along the line XXVI—XXVI of Fig 32.
Fig. 27 is a section on the line XXVII—XXVII of Fig. 26.

For preventing axial movement of the shell within the loader, a latch 430 (Figs. 26 and 27) is provided. This latch has a depending shank portion 432 mounted for vertical movement in a bore 434 formed in a support 435 carried by the rearward portion of the carriage 380. A compression spring 436 within the bore 432 acts upon the latch 430 to move it upwardly to a position determined by the engagement of a stop screw 438 with a shoulder 440 formed in the rearward side of the latch. The forward portion of the latch is inclined at 442 so that upon rearward movement of the shell the engagement of the flange thereof with the inclined surface 442 causes the latch to move downwardly against the force of the spring 436 until the flange reaches the grooved portion 444 whereupon the spring snaps the latch into locking position as shown in Fig. 26. Accordingly during the upward movement of the loader the shell is held securely therein between the retaining plates 404 and by the latch 430.

Figure 25:
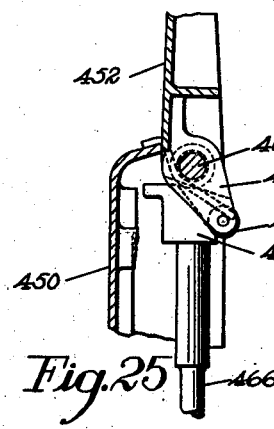
Fig. 25 is a view of a portion of the mechanism for holding the cover of the casing elevated while the loader is in its up position.
Figure 29:
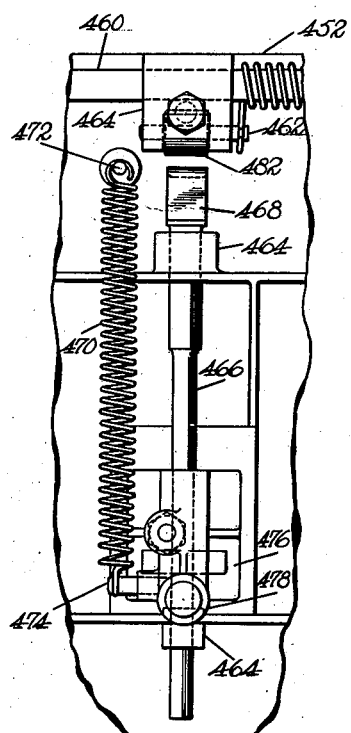
Fig. 29 is a side elevation of the mechanism for holding the cover of the loader mechanism open.

When the loader is in its lowermost position it is enclosed by a housing 450 on the track 370 having a hinged cover 452 which is pivoted out of the way upon upward movement of the loader by a pin 454 formed in a bracket 456 carried by the upper portion of the carriage. This housing protects the shell holder from empty shell cases ejected from the gun after firing. The cover 452 is normally held in closed position by a torsion spring 458 surrounding a pin 460 upon which the cover is hinged and acting between the vertical wall of the housing and a pin 462 carried by a downwardly and rearwardly extending arm 464 secured to the cover as shown in Figs. 24 and 29. In order that the loader may be returned to shell-receiving position at the completion of a loading operation, provision is made for maintaining the cover 452 open after the loader has passed through the top of the housing and until it has returned to a position in which it is wholly within the housing. Mounted for vertical movement in brackets 465 carried by the side walls of the housing 450 is a rod 466 provided at its upper end with a latch 468. The rod is normally urged upwardly by a spring 470 acting between a pin 472 carried by the housing and a pin 474 carried by a roll support 476 secured to the lower portion of the rod. A roll 478 carried by the support 476 is positioned for engagement with a projection 480 of the carriage 380 when the carriage is in its lowermost position thereby to hold the rod 466 in the position shown in Fig. 24 against the force of the spring 470. As the loader moves upwardly and the cover 452 is opened by the pin 454, the arm 464 swings inwardly as indicated in Fig. 25. The rod 466 is now free to be moved upwardly by the spring 470 inasmuch as the projection 480 of the carriage 380 moves away from the roll 478. The inclined surface of the latch 468 now engages the roll 482 carried by the pin 462 to maintain the cover in its open position until the loader returns to its shell-receiving position, causing the latch supporting rod 466 to move downwardly against the force of the spring 470 and freeing the roll 482 so that the torsion spring 458 is effective to return the cover 452 to its closed position.

For moving the loader vertically along the track 370 a chain 484 (Figs. 1, 33, 36 and 37) is provided in a housing 488 formed on the rearward portion of the guideway 372. This chain is driven from a sprocket 490 carried by a shaft 492 journaled in the lower portion of the housing and passes over guide sprockets 494, 496 and 498 in the upper portion of the housing. The proper tension on the chain is maintained by an adjustable roller 500 arranged for engagement with the outside of the chain. The plate 386 carried by the carriage is provided with spaced projections 502 (Fig. 33) forming between them a groove in which is slidably received a block 504 secured to a pin 506 (Fig. 35) which projects laterally beyond the chain and also serves to connect a pair of links of the chain together.

For operating the chain a piston 510 slidable in a cylinder 512 secured to the side of the track 370 is provided. The piston includes a rod 514 projecting outwardly of the cylinder 512 and terminating in a rack 518 received by a casing 520 secured to the lower portion of the cylinder 512. This rack meshes with a pinion 522 (Figs. 36 and 37) mounted on a shaft 524 journaled in the lower portion of the casing 520. This shaft also carries a gear 526 meshing with a pinion 528 carried by the shaft 492 on which is mounted the sprocket 490. Upon admission of the pressure fluid into the upper portion of the cylinder 512 the piston 510 is moved downwardly and acts through the rack and gearing above described to turn the drive sprocket 490 and operate the chain in a direction to cause the loader to be elevated.

With the loader in position to receive a shell from the transfer tray, a valve 530 (Figs. 1, 24 and 33), secured to the lower end of the guideway 372, is positioned to permit firing of the gun. This valve also serves to prevent operation of the magazine-indexing mechanisms unless the loader is in its lowermost position to receive a shell from the transfer tray. The operation of this valve will be discussed as the description proceeds. For positioning the valve 530, the plate 386 carried by the loader, carries a valve-actuating arm 532 engageable with a stem 534 of the valve to position the valve when the loader is in its shell-receiving position. Upon elevation of the loader the valve is shifted by a spring contained therein so as to prevent operation of the firing mechanism and the shell-indexing mechanism until the loader has returned to its lowermost position.

After the loader has been elevated to a position in which the shell carried thereby is in alinement with the bore of the gun, the latch 430 is depressed as indicated in Fig. 34 to permit movement of the shell out of the loader by the rammer. For this purpose the latch carries an adjustable abutment screw 536 arranged to engage the lower end of a rammer arm 538 when the shell is in ramming position thereby to depress the latch against the force of the spring 436 (Fig. 26). The position of the rammer arm 538 depends upon the position of the gun in elevation and accordingly, for any position of the gun in elevation, the latch 430 will be depressed at the proper time in the upward movement of the loader.

During the ramming operation the shell-engaging plates 404 by which the shell is retained in the loader are moved with their supporting tubes 396 toward the left against the force exerted by the springs 398 as indicated in Fig. 45. Accordingly the shell is supported by the loader during the early part of the ramming movement and until the shell is about to enter the breech of the gun thereby to insure accurate alinement of the shell with the gun during the ramming operation. After the shell has been rammed into the gun the springs 398 return the parts to the positions shown in Figs. 30 and 32. It will be noted that the rearward ends of the plates 404 are flared as indicated in Fig. 28 to facilitate passage of the flange of the shell therethrough.

Figures 38, 39:
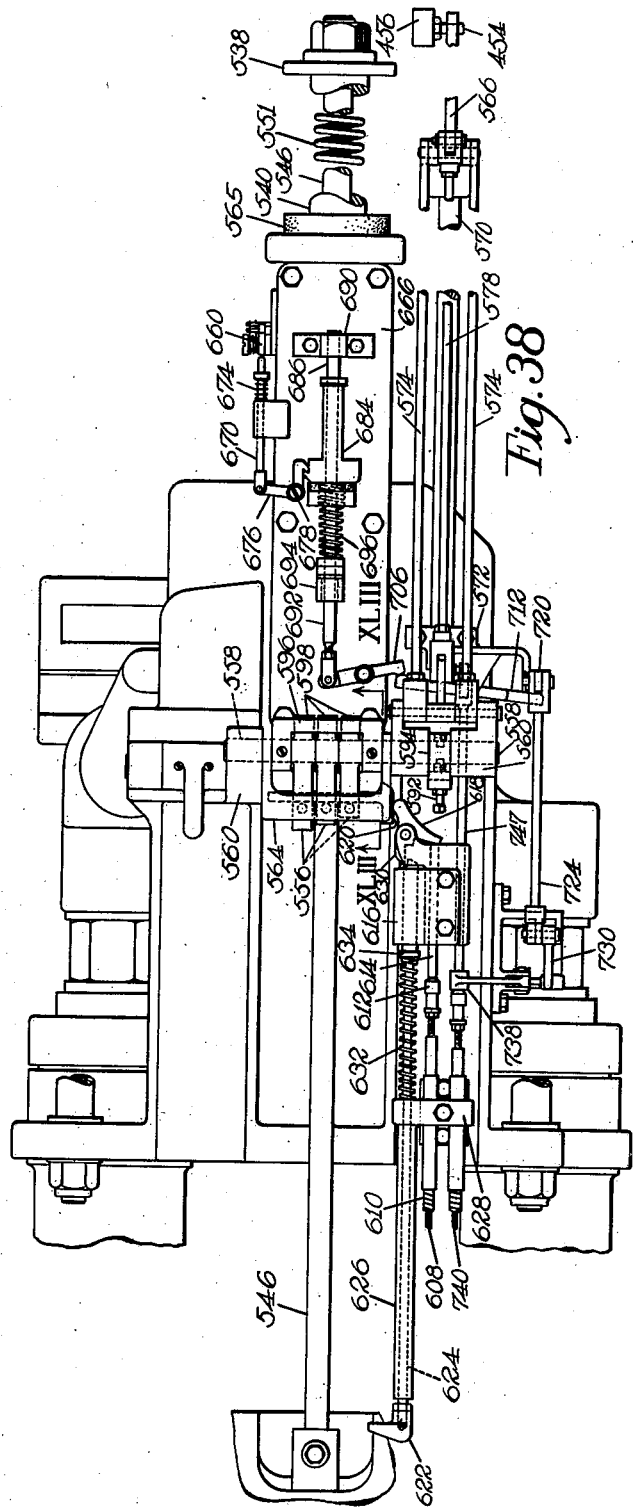
Fig. 38 is a plan view of the rammer and associated control mechanisms.
Fig. 39 is a vertical longitudinal section through the rammer.

The arm 538 of the rammer is carried by the rear end of a tube 540, Fig. 39, supported for sliding movement by bushings 541 in a sleeve 542 carried by a support 544 movable with the barrel of the gun. Extending through the rammer tube 540 is a rod 546 secured at its forward end by a pin 548 to the gun carriage. Movement of the rammer is effected by springs 550, 551 in the tube 540 surrounding the rod 546, the adjacent ends of the springs abutting a collar 552 slidable on the rod 546, the springs acting between a latch plate 554 secured to the forward end of the tube 540 and a collar 555 fast on the rear end of the rod 546. The rammer 538 is held in its rearward position while a shell is being moved into ramming position by a series of latches 556 (Figs. 38, 39, 43 and 44). These latches are spaced slightly from one another lengthwise of the gun to insure engagement with the latch plate 554. The latches are journaled on a shaft 558 carried by supports 560 (Fig. 38) on the gun carriage and are urged downwardly by springs 562 acting between a bracket 564 rigid with the supports 560 and the upper portions of the latches. During movement of the gun in recoil, following a firing operation, the sleeve 542 moves rearwardly and by the engagement of a bumper 565 (Fig. 39) with the rammer arm 538 carries the rammer rearwardly until the latch plate 554 moves rearwardly of the latches 556 at the same time compressing the springs 550, 551 by which forward movement of the rammer is effected. During movement of the gun in counterrecoil the latch plate 554 engages the rearmost latch 556 to lock the rammer in its rearward position. In the event that the recoil stroke is not long enough to carry the latch plate beyond the rearmost latch 556, or should this latch fail properly to engage the latch plate, one of the other latches will lock the rammer against forward movement with the gun.

The latches 556 are moved upwardly to release the rammer for forward movement upon movement of a shell into alinement with the bore of the gun. This is effected by engagement of the pin 454 (Fig. 24) with a lever 566 (Fig. 1) pivoted at 568 to the rearward end of a rod 570 supported at its forward end by a bracket 572 secured to the gun carriage. Support for the rearward end of the rod 570 is provided by a pair of rods 574 which are connected at their forward portions to the bracket 572 as shown in Fig. 42. The lever 566 includes an upstanding arm 576 connected by a link 578 to an arm 580 pivoted between ears 582 on the supporting rod 570. The arm 580 includes a cam portion 584 engageable with a roll 586 journaled in the lower portion of an arm 588 secured to and depending from the shaft 558 by which the latches 556 are carried. The arm 588 is held by a spring 590 in the position shown in Fig. 42 with the roll 586 in engagement with a surface 584 of the cam 580. Movement of the arm 588 by the spring 590 is limited by a stop screw 592 carried by an extension 594 of the arm 588 and engaging an adjacent portion of the bracket 572. Carried by the shaft 558 and secured thereto as shown in Figs. 38 and 44 is a U-shaped latch-releasing member 596 overlying rearward extensions or tails 598 of the latches 556. When the shaft 558 is moved in a counterclockwise direction as viewed in Figs. 42 and 43 the member 596 engages the tails 598 of the latches to lift the latches out of engagement with the latch-engaging plate 554. This movement of the shaft 558 is effected upon forward movement of the rod 578 upon actuation of the lever 566 by the shell moving into alinement with the bore of the gun. Movement of the rod 578 to the left moves the arm 580 in a counterclockwise direction whereupon the surface 584 of the arm acts on the roll 586 to rock the shaft 558 and release the latches. The rammer now moves forwardly under the force of the springs 550, 551 until the arm 538 engages the bumper 566 which softens the blow when the rammer comes to rest in its forwardmost position. A bumper 604 is suitably secured to the gun carriage near the latches 556 for engagement with the rear of the latch-engaging plate 554. The inertia of the rammer at the end of the recoil stroke of the gun causes its continued rearward movement until the bumper 604 is engaged by the plate 554 which is then in position for engagement by the latches 556.

The rammer, during its forward movement, actuates a valve 606 (Fig. 2) mounted on a plate 607 in the basket B. To the stem of the valve is connected a flexible cable 608 which passes through a tube 610 and terminates at its upper end in a head 612 (Fig. 38) positioned for engagement by a rod 614 slidable in a bracket 616 carried by the gun support. The rearward end of the rod 614 engages an arm of a latch 618 pivoted to the support 616 and having a portion engageable with a cam 620 secured to the forward end of the rammer tube 540. With the rammer in its latched position the cam holds the latch 618 in the position shown in Fig. 38 thereby holding the valve 606 downwardly as viewed in Fig. 2 against the force of a spring tending to move it in the opposite direction. Upon forward movement of the rammer the latch 618 is released thereby permitting movement of the valve under the force of the spring. It is desirable, however, that this valve, the function of which is to control the operation of the indexing mechanism when the rammer is in its latched position, should not be released by the latch 618 until the rammer has moved sufficiently far forward to ram the shell into the gun. Accordingly, the latch 618 is not allowed to move until the cam 620 engages an abutment 622 carried on the forward end of a rod 624 slidable in a sleeve 626 secured to a support 628 on the gun carriage, the rearward portion of the rod engaging an arm 630 of the latch 618 so as to hold the latch in the position shown until the rod 624 has moved forwardly. The rod is held in its rearward position by a spring 632 acting between the support 628 and a collar 634 on the rearward portion of the rod 624. Thus as the rammer moves forwardly and the cam moves out of engagement with the latch 618, the latch is still held in the position shown by the rod 624 until the cam 620 engages the abutment 622 moving the rod forwardly out of engagement with the arm 630 of the latch 618. The latch is not returned into the position shown until the gun has recoiled sufficiently to carry the rammer into its latched position whereupon the cam 620 engages the latch 618 thereby to actuate the valve 606 after which the indexing mechanism is able to start operating.

Figure 40:
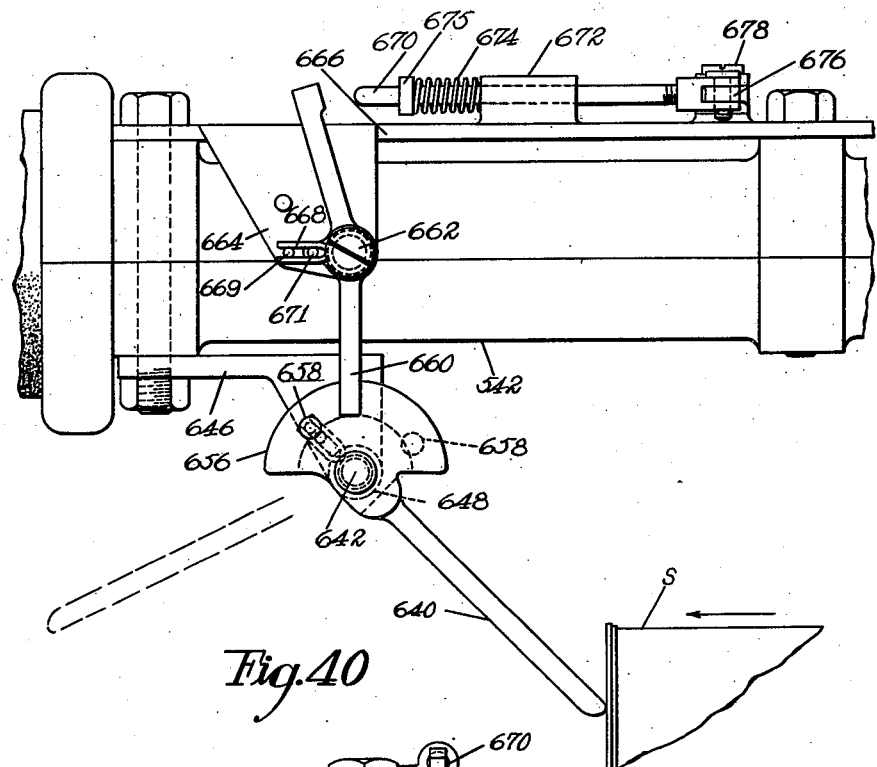
Fig. 40 is a side elevation of the safety mechanism which must be operated by ejection of a shell before another shell can be moved into loading position.
Figure 41:
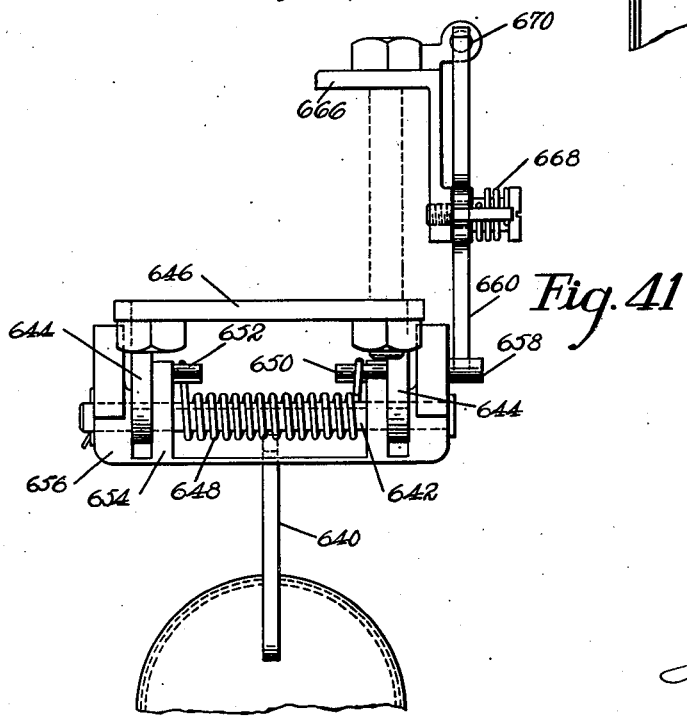
Fig. 41 is a rear end elevation of the safety mechanism illustrated in Fig. 40.

In order to prevent operation of the loader to carry a shell into the ramming position in the event that a previously fired shell has not been properly ejected from the breech of the gun, safety mechanism operated by an ejected shell case is provided. This mechanism is controlled by an arm 640 (Figs. 1, 40 and 41) arranged in the path of movement of a shell case while it is being ejected from the gun. This arm is carried by and depends from a shaft 642 journaled in arms 644 of a bracket 646 secured to the under side of the sleeve 542. Surrounding the shaft 642 is a torsion spring 648 one end of which engages a pin 650 carried by one of the supporting arms 644 and the other end of which engages a pin 652 carried by an arm 654 of a member 656 carried by the shaft 642. The spring 648 normally holds the arm 640 in the position illustrated in Figs. 1 and 40. Upon ejection of a shell case from the gun the arm 640 is engaged thereby as shown in Fig. 40 and moved into the broken line position against the force of the spring 648. After the shell has been entirely ejected from the gun the spring carries the arm back into the full line position. The member 656 carries a laterally projecting pin 658 arranged to engage the lower end of an arm 660 as the arm 640 is moved by the ejected shell case. The arm 660 is pivoted on a stud 662 carried by a depending wall 664 of a supporting plate 666 secured to the top of the sleeve 542. Surrounding the stud is a torsion spring 668 the ends of which are engageable with opposite sides of a pin 669 carried by the wall 664. The arm 660 includes a laterally extending portion carrying a pin 671 received between the ends of the torsion spring 668. The torsion spring normally holds the arm 660 in the position shown in Fig. 40 and as the arm 640 is moved into the broken line position the arm 660 is moved in a counterclockwise direction until the pin 658 passes the lower end of the arm whereupon the arm returns into the position shown. Upon the return movement of the arm 640 under the influence of the spring 648 the pin 658 engages the forward side of the arm 660 moving it in a clockwise direction whereupon the upper end of the arm engages the end of a rod 670 slidable in a sleeve 672 carried by the supporting plate 666, to move the rod forwardly against the force of a spring 674 acting between the sleeve 672 and a collar 675 carried by the rod. Inasmuch as the rod 670 is engaged only upon the return movement of the arm 640 it will be apparent that no motion is imparted to the rod until the shell case has been entirely ejected from the gun permitting the arm 640 to return into its normal position.

The rod 670 is connected at its forward end to a bell crank lever 676 (Fig. 47) pivoted at 678 to the plate 666. Pins 680, projecting upwardly from the plate 666 limit movement of the bell crank lever about its supporting pivot. The bell crank lever includes an arm 682 forming a latch engageable with a shoulder of a block 684 slidable on the plate 666, the forward portion of the block being formed as a guide rod 686 slidable in a bearing 690 secured to the plate 666. The block 684 forms an abutment for the rearward end of a rod 692 slidable in a bearing 694 carried by the plate 666 and urged rearwardly by a spring 696 acting between the bearing and a head 698 on the rearward end of the rod. This head carries a yieldable face member 700 engageable with the forward end of the block 684 and upon movement of the bell crank lever 676 by the arm 660 after a shell has been ejected from the gun the block 684 is free to move rearwardly thereby permitting the rearward movement of the rod 692 by the spring 696. The yielding face 700 on the head 698 of the rod softens the blow between the head and the block 684 when the parts are returned to the positions shown in Fig. 47 during recoil of the gun as will be explained, and to soften the blow between the block and the bearing 690 a yieldable member 702 is carried by the cylindrical portion 686 of the block.

The forward end of the rod 692 is connected by a pin-and-slot connection 704 to a lever 706 pivoted at 708 on the plate 666. Upon rearward movement of the rod 692 by the spring 696, the outer end of the lever 706 engages an upstanding arm 710 of a lever 712 pivoted at 714 on a laterally extending portion 716 of the bracket 572. The lever 712 includes an arm 718 engageable with a lower end of a lever 720 pivoted at 722 on the bracket 572 and connected by a link 724 to a bell crank lever 726 pivoted on a bracket 728 secured to the gun carriage. The bell crank lever 726 includes an arm 730 engageable with an arm 732 of a member 734 pivoted at 736 on the bracket 728. The member 734 includes a stop block 738 arranged when the parts are in the positions shown in Figs. 46 and 47 to engage the end of a flexible cable 740 which passes through a sleeve 742 (Fig. 2) and is connected at its lower end to the stem 744 of a valve 746. This valve controls the operation of the loader and is normally held by a spring in a position to prevent the flow of pressure fluid into the cylinder 512 (Fig. 1) to cause elevation of the loader, as will be explained. When a shell has been carried by the transfer mechanism into position on the loader, fluid under pressure is introduced into the valve 746 tending to move it against the force of the spring to apply pressure fluid into the cylinder 512. In the event, however, that the block 684 is held in the position shown in Fig. 47 by reason of the fact that the case of the previously fired shell has not been properly ejected from the gun, the stop block 738 remains in engagement with the end of the flexible cable 740 preventing shifting of the valve 746 and the introduction of pressure fluid into the cylinder 512 above the piston 510, thus insuring that there will be no fouling of the mechanism by attempting to load a shell into the gun when the breech has not been cleared of the case of a previously fired shell. If the shell case has been properly ejected the movement of the arm 640 thereby, as previously described, releases the block 684 and through the aforedescribed connections causes the stop block 738 to be moved out of engagement with the end of the flexible cable 740 so that the valve 746 can operate and pressure fluid is admitted into the cylinder 512. After the gun is fired and recoils the block 684, by reason of its inertia, moves with relation to the plate 666 at the end of the recoil stroke and becomes locked in the position shown in Fig. 47 by the latch 682. If the shell case is properly ejected the block will again be released but if for some reason the shell case remains in the breech of the gun the arm 640 is not operated and the valve 746 remains locked in the position in which it prevents the flow of pressure fluid into the cylinder 512.

Assuming that the stop block 738 of Fig. 46 is moved out of engagement with the end of the cable 740 and pressure fluid is introduced into the upper end of the cylinder 512, the loader elevates the shell into alinement with the bore of the gun. Simultaneously with the release of the latches 556 which hold the rammer in its cocked position the valve 746 is shifted to cut off the flow of pressure fluid into the cylinder 512. This is effected by movement of the lever 566 by the pin 454 (Fig. 24) carried by the loader mechanism. The rod 578 moved by the lever 566 is connected by a link 745 to a rod 747 which is at this time in engagement with the upper end of the flexible cable 740 and accordingly transmits motion through the cable to the valve 746 to move it into position to cut off the flow of pressure fluid to the cylinder 512 whereupon the loader comes to rest. The operation of this and the other valves will be explained in detail in the description of the sequence of operation which follows.

Fig. 49 illustrates diagrammatically the positions of the parts when the gun is loaded and ready to be fired. The firing is effected by closing a switch 806 which completes a circuit through a solenoid 808 which in turn operates the firing mechanism. The firing mechanism forms no part of the present invention and is not disclosed herein. The circuit through the solenoid includes a second switch 810 which is closed only when the transfer tray is in its forward shell-receiving position and the loader is in its lowermost position ready to receive a shell from the transfer tray. The switch 810 is controlled by a piston 812 in a cylinder 814, the piston being urged downwardly by a spring 816 to open the switch 810 when pressure is not applied behind the piston. If the transfer mechanism is in its forward position and the loader is in its down position, valves 360 and 530 are positioned as shown so that pressure fluid flows from a supply line 818 through a pipe 820, valve 530, pipe 822, valve 360 and pipes 824, 826 to the cylinder 814 behind the piston. Should the loader not be in its down position, the member 828 of the valve 530 is moved upwardly by a spring 830 to cut off the flow through the pipe 822. Similarly, if the transfer tray is not in its forward position the member 832 of the valve 360 is moved upwardly by a spring 834 to cut off the flow of pressure fluid through the pipe 824.

Prior to firing the gun by closing the switch 806 the operator selects from which magazine a shell is to be fed to the gun after the firing operation. This selection is made by positioning a valve member 836 of a selector pilot valve 838. With the valve member in the position shown in Fig. 49 the left hand magazine will feed the next shell but if the valve be moved toward the left the other magazine will feed the shell following the firing operation. The position of this valve controls the position of a valve member 840 of a selector valve 842. With the selector pilot valve member 836 positioned as shown, pressure fluid flows into the lower end of the valve 842 behind a piston 844 to position the valve member 840 as illustrated. The fluid flows into the lower end of the valve 842 as follows: From a supply line 846 through a port 848 of a valve 850, pipe 852 and valve 854, pipes 856, 858, valve 838 and pipe 860. Should the selector pilot valve member 836 be moved to the left at this time the fluid will flow from the pipe 858 through the valve 838 and a pipe 862 into the top of the valve 842 to move the valve member 840 downwardly. With the valve member 836 positioned as shown, the pipe 862 is connected through the valve 838 and a pipe 863 to exhaust. The valve members 850 and 854 are positioned in valve casings formed at the rearward ends of the transfer cylinders 108 and are held in the positions shown at the time the gun is ready to fire by the pistons 110 which engage the forward ends of valve stems 864 projecting through the walls of the cylinders. The indexing pistons 110 are maintained in the positions shown at this time by pressure fluid which flows from a supply line 868 through a main indexing valve 870, pipe 872, valve 842, pipe 874 which opens into the forward end of the left hand cylinder 108, and pipes 876, 878 leading into the right hand cylinder 108. The piston 190 which operates the transfer mechanism is held in its forward position by fluid pressure flowing from a supply pipe 880 through transfer valve 882 and a pipe 884 leading into the cylinder 169 forwardly of the piston 190. The piston 510 which operates the loader is maintained in its uppermost position with the loader in its shell-receiving position by pressure fluid passing through the supply pipe 818, pipe 886, valve 746 and a pipe 888 communicating with the lower portion of the cylinder 512. The valve 746 includes a valve member 890 held in the position illustrated by a spring 892.

Upon closing the firing switch 806, the gun fires and during the recoil stroke the rammer is latched in its rearward position by the latches 556 of Figs. 38, 39 and 43. With the rammer in this position the cam 620 of Fig. 38 acts through the lever 618 and the flexible cable 610 to move the valve member 894 of the valve 606 upwardly against the force of a spring 896 into the position in Fig. 50. This movement of the valve member causes pressure fluid to be supplied to the left end of the indexing valve 870 thereby to move the valve member 898 into the position shown in Fig. 50, the fluid flowing as follows: from the supply pipe 818 through pipe 820, valve 530, pipe 822, valve 360, pipes 824, 900, valve 340, pipe 902, valve 606 and pipe 904. The pressure fluid now acts upon a piston at the left end of the valve member 898 to move the valve member to the right so as to provide communication from the supply pipe 868 through a pipe 906, the valve 842 and a pipe 908 into the left hand cylinder 108 behind the piston 110 thereby moving the piston toward the right to index the shells in the left hand magazine as heretofore described. The pressure fluid ahead of the piston 110 exhausts through the pipe 874, valve 842, pipe 872, valve 870 and pipe 914. The pressure from the supply pipe 846 acting on the valve 850 moves the valve into the position shown in Fig. 50 upon movement of the piston 110 to the right, thereby cutting off the flow through the pipe 852. This prevents movement of the selector valve member 840 during the indexing operation should the operator inadvertently shift the selector pilot valve 838. The movement of the valve 850 traps the fluid below the valve 840 so that it remains in the position shown at least until the piston 110 returns to its initial position returning the valve 850 into its initial position. Upon the return of these parts to their initial positions the valve 840 is again under the control of the valve 838.

As explained above, if the valve member 836 of the selector pilot valve 838 were previously positioned in its left position then the valve member 840 of the selector valve 842 would be in its down position. In this event fluid would pass from the pipe 906 through the valve 842 and a pipe 909 into the right hand cylinder 108 behind the piston 110 therein, thereby moving this piston toward the left to index the shells in the right hand magazine, the pressure fluid ahead of the piston exhausting through a pipe 875, valve 842, pipe 872, valve 870 and pipe 914. The pressure fluid from the supply pipe 846 passing through pipe 852 acts on the valve 854 to move it to the left upon movement of the piston 110 to the left thereby cutting off the fluid through the pipe 856 and preventing movement of the selector valve member 840 during the indexing operation should the operator inadvertently shift the selector pilot valve 838.

It will thus be understood that the indexing operation is similar and the remainder of the operations described below are the same regardless of from which magazine shells are loaded.

Figure 51:
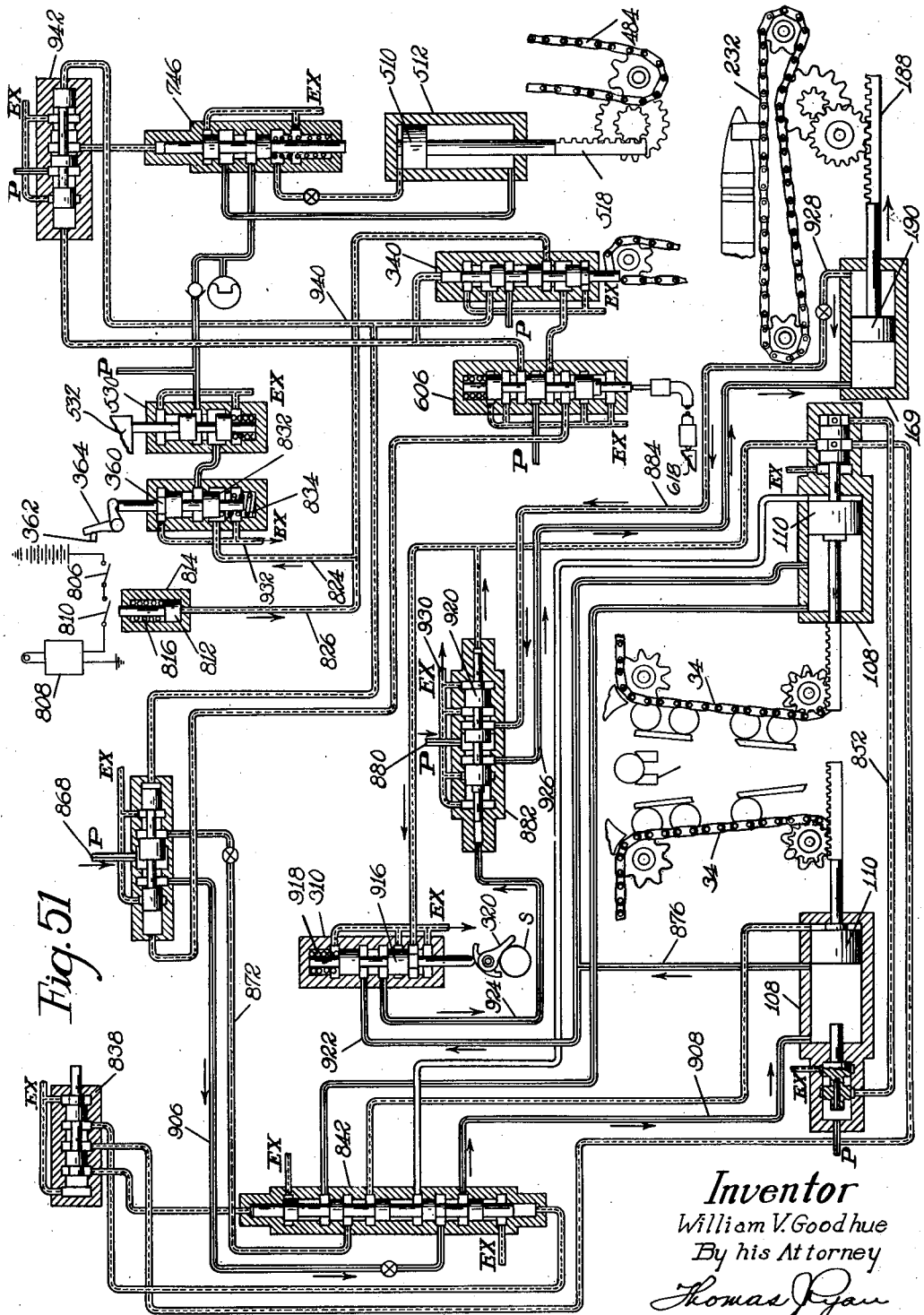

The movement of a shell onto the transfer mechanism operates the arm 320 (Fig. 17) thereby moving the valve member 916 of the transfer pilot valve 310 upwardly against the force of a spring 918 into the position shown in Fig. 51. Pressure fluid now flows in the left end of the transfer valve 882 to move the valve member 920 to the right as follows: From the left hand cylinder 108, which is still connected to the supply line 868 as previously described, through the pipe 876, a pipe 922, valve 310 and pipe 924. The movement of the valve member 920 to the right permits pressure fluid to flow into the cylinder 169 behind the piston 190 as follows: From the supply pipe 880 through the valve 882 and a pipe 926. The pressure fluid ahead of the piston exhausts through a pipe 928, the valve 882 and a pipe 930. The shell is accordingly moved rearwardly as indicated in Fig 51 by the operation of the chain 232 to carry the shell onto the loader, and the clutch member 78 (Fig. 9) is shifted to lock the shaft 74 against further rotation. As soon as the transfer mechanism begins to operate, the valve member 832 of valve 360 is permitted to move under the influence of the spring 834 into the position illustrated in Fig. 51 by the movement of the pin 362 (Fig. 17) away from the bell crank lever 364. This cuts off the flow of pressure fluid into the cylinder 814 and the fluid exhausts through the pipes 826, 824, valve 360 and pipe 932 whereupon the switch 810 is opened so that the firing mechanism cannot be operated in the event that the operator should inadvertently close the switch 806 at this time.

After the shell has been carried onto the loader, the member 342 (Fig. 17), carried by the transfer chain 232, operates through arm 344, lever 348 to move the valve member 936 of valve 340 into the position shown in Fig. 52. Pressure fluid now flows from a supply pipe 938 through the valve 340 and a pipe 940 into the right end of a valve 942 thereby moving a valve member 944 therein to the left as shown in Fig. 52. This movement of the valve member 944 permits pressure fluid to flow from a supply pipe 946 through the valve 942 and a pipe 948 into the end of the valve 746 thereby to move the valve member 950 thereof against the force exerted by a spring 952. This movement is permitted, however, only in the event that the shell case of the previously fired shell has been completely ejected from the gun. If the shell case has not been fully ejected, the stop block 738 of Fig. 46 which engages the end of the flexible cable 740 connected to the valve member 950, prevents the movement of the valve member out of the position shown in Fig. 51 by the admission of the pressure fluid entering the valve through the pipe 948. However, if the shell has been fully ejected and the stop block 738 does not interfere, the valve member 950 moves downwardly as viewed in Fig. 52 somewhat below the position illustrated therein to permit pressure fluid to flow through the supply pipe 818, pipe 886, valve 746 and pipe 954 into the upper portion of the cylinder 512 thereby to move the loader piston 510 downwardly to elevate the shell. The pipe 886 is provided with a check valve 887 and an accumulator 889 is connected into the pipe 886 thereby to insure that sufficient pressure fluid will be available properly to operate the loader. The movement of the valve member 936 also causes pressure fluid to flow from the supply pipe 938 through pipes 940 and 958 into the right end of the valve 870 thereby to move the valve member 898 to the left, the fluid exhausting at this time from the left end through pipe 904, valve 606, pipe 960, valve 340 and exhaust pipe 962. The movement of the valve member 898 into the position shown in Fig. 52 directs fluid ahead of the piston 110 in the left hand cylinder 108 to return the piston, the fluid flowing from the supply pipe 868, valve 870, pipe 872, valve 842 and pipe 874. The fluid exhaust from behind the piston 110 through pipe 908, valve 842, pipe 906, valve 870 and exhaust pipe 914, whereupon the indexing piston returns to its initial position.

The movement of the piston 110 into its initial position causes valve 850 to move into the position illustrated, thereby to direct pressure fluid into the right end of the transfer valve 882 as follows: from the supply pipe 846 through valve 850, pipe 852, valve 854 and pipes 970, 972. The valve member 920 is thus moved to the left, fluid exhausting from the left end of the valve chamber through pipe 924, valve 310 and pipe 974. It will be understood that the valve member 916 of the valve 310 is returned into the position shown by the spring 918 after the shell on the transfer mechanism has been moved out of engagement with the arm 320. With the valve member 920 in the position shown, the flow to the cylinder 169 housing the transfer piston 190 is reversed whereupon the piston is moved toward the left thereby to return the chain 232 into its initial shell-receiving position.

After the loader has raised the shell into alinement with the bore of the gun, the valve member 950 is moved upwardly by the engagement of the pin 454 (Fig. 24) with the lever 566 (Fig. 1) which acts through the mechanism shown in Fig. 38 to shift the valve member 950 into the position shown in Fig. 52 thereby to cut off the flow through the pipe 954 into the cylinder 512. At the same time the exhaust of fluid from below the piston is cut off through the pipe 888 by the valve member 950 so that the fluid is trapped at opposite sides of the piston 510 and the loader immediately comes to rest with the shell in alinement with the bore of the gun for the ramming operation.

The movement of the lever 566 by the shell also releases the latches holding the rammer in its cocked position whereby the rammer drives the shell forwardly into the gun. This movement of the rammer releases the valve member 894 to the action of the spring 896 whereupon the valve member moves downwardly into the position shown in Fig. 49. This downward movement of the valve member 894 places the left end of the valve 942 in communication with a supply line 980 through a pipe 981, and the right end of the valve exhausts through pipe 940 and valve 340 which has been moved by pressure fluid from the supply line 980 acting on the top of the valve, into the position shown in Fig. 49. The return of the valve member 944 into the position shown in Fig. 49 permits fluid to exhaust from the upper portion of the valve 746 whereupon the valve member 890 is moved upwardly by the spring 892. The upper portion of the cylinder 512 is now exhausted through pipe 954, valve 746. Pressure fluid flows into the lower end of the cylinder 512 through the pipes 818, 886, valve 746 and pipe 888 whereupon the loader is moved downwardly into shell-receiving position. When the loader is in its down position the valve member 828 is moved downwardly by the arm 532 against the force of the spring 830 and the valve member 832 is likewise moved downwardly by lever 364 when the transfer mechanism has returned to its shell-receiving position whereupon pressure fluid flows in the cylinder 814 causing switch 810 of the firing mechanism to close. In the event that either of the loader or transfer mechanisms have not returned to their initial positions the switch 810 will remain open and it will be impossible to fire the gun by closing the switch 806 thereby preventing subsequent fouling of the mechanisms.

From the above it will be seen that all the fluid-pressure operated mechanisms are required to operate in proper sequence and if any one of them fails to function properly, the cycle of operations will be interrupted thus obviating the danger of damage to the apparatus. Furthermore, should the empty shell case not be properly ejected, or the rammer fail to be latched in its back position, the loading mechanism cannot operate.

Having thus described the invention, what I claim as new and desire to secure by Letters Patent of the United States is:

1. Mechanism for loading a gun comprising a pair of shell magazines, means for feeding shells from the magazines to the gun, a motor, means operatively connecting said motor to said feeding means, means for delivering shells from the magazines to said feeding means, control means for preselecting the magazine from which a shell is to be delivered to said feeding means, and means operative in response to movement of a shell onto the feeding means for initiating operation of said motor.

2. Mechanism for loading a gun comprising a pair of shell magazines, means for feeding shells from the magazines to the gun, means associated with each magazine for delivering shells therefrom to the feeding means, motors, means operatively connecting said motors to said shell-delivery means, manually operated control means for preselecting the magazine from which a shell is to be delivered to said feeding means, and means operative in response to the firing of the gun for initiating operation of one of the motors to operate one of the shell-delivering means in accordance with the position of said control means.

3. In a gun-loading mechanism, a pair of shell magazines, indexing means associated with each magazine, fluid pressure-operated means for operating said indexing means, and a valve for selectively controlling the operation of said indexing means.

4. Mechanism for loading a gun comprising a pair of shell magazines, indexing means associated with each magazine, fluid-pressure-operated means for operating said indexing means, a valve for selectively controlling the operation of said indexing means, and means controlled by the firing of the gun for initiating operation of one of said indexing means as determined by the position of said valve.

5. In combination, a gun, a pair of shell magazines separate and remote from the gun, indexing means associated with each magazine, control means for causing operation of one or the other of said indexing means in accordance with the position of said control means, means for initiating the operation of said indexing means, and means operated by the indexing means to prevent shifting of said control means except while the indexing means are both in initial positions.

6. In a gun-loading mechanism, a pair of shell magazines, indexing means associated with each magazine, a fluid-pressure-operated member connected to each of said indexing means for operating it, a valve for directing pressure fluid to one or the other of said fluid-pressure-operated means in accordance with the position of said valve, a control member for shifting said valve, and means for rendering said control member ineffective to shift the valve during an indexing operation.

7. In combination, a gun, a shell magazine below and forwardly of the breech end of the gun, means for feeding shells from the magazine, a transfer tray for receiving a shell from the magazine and for carrying the shell rearwardly of the gun, and means operated by the shell in its movement onto the tray for initiating operation of the tray.

8. In combination, a gun, a transfer tray below the gun and forwardly of the breech end thereof, means for feeding shells one at a time laterally onto the transfer tray, and means controlled by movement of the shell onto the transfer tray for causing movement of the tray to carry the shell thereon rearwardly of the gun.

9. In combination, a gun, a transfer tray below the gun and forwardly of the breech end thereof, means for feeding shells one at a time laterally onto the transfer tray, fluid-pressure-operated means for moving the tray to carry the shell thereon rearwardly of the gun, and means operated by the shell in its movement onto the transfer tray for directing pressure fluid to said fluid-pressure-operated means.

10. In combination, a gun, a transfer tray below the gun and forwardly of the breech end thereof, means for feeding shells one at a time laterally onto the transfer tray, fluid-pressure operated means for moving the tray to carry the shell rearwardly of the gun, means for receiving the shell from the transfer tray and elevating it into alinement with said gun, fluid-pressure-operated means for actuating said elevating means, means operated by movement of the shell onto the tray for directing pressure fluid to the first named fluid-pressure-operated means, and means operated in response to movement of the tray rearwardly to a predetermined position for directing pressure fluid to said last named fluid-pressure-operated means.

11. In combination, a gun, a transfer tray movable to carry a shell from a position below the gun to a position rearwardly thereof, a loader arranged to receive the shell and elevate it into ramming position, means responsive to the firing of the gun for loading a shell onto the transfer tray, means responsive to the movement of the shell onto the tray for causing movement of the tray, and means preventing firing of the gun unless the tray and loader are in their shell-receiving positions.

12. In combination, a gun, a transfer tray movable to carry a shell from a position below the gun to a position rearwardly thereof, a loader arranged to receive the shell and elevate it into ramming position, means responsive to the firing of the gun for loading a shell onto the transfer tray, means responsive to the movement of the shell onto the tray for causing movement of the tray, means preventing firing of the gun unless the tray and loader are in their shell-receiving positions, and means for automatically operating the loader after a shell has been moved thereon by the transfer tray.

13. In combination, a gun, a loader for elevating shells into alinement with the gun, fluid-pressure-operated means for operating said loader, means for feeding shells onto said loader, fluid-pressure-operated means for operating said feeding means, means for directing pressure fluid to said first named fluid-pressure-operated means in response to movement of a shell onto the loader, and means for directing pressure fluid to said second named fluid-pressure-operated means in response to movement of a shell onto the feeding means.

14. In combination, a gun, a loader for elevating shells into alinement with the gun, fluid-pressure-operated means for operating said loader, means for feeding shells onto said loader, fluid-pressure-operated means for operating said feeding means, means for directing pressure fluid to said first named fluid-pressure-operated means in response to movement of a shell onto the loader, means for directing pressure fluid to said second named fluid-pressure-operated means in response to movement of a shell onto the feeding means, and means preventing firing of the gun unless the loader and feeding means are in shell-receiving positions.

15. In combination, a gun, a loader for elevating shells into alinement with the gun, fluid-pressure-operated means for operating said loader, means for feeding shells onto said loader, fluid-pressure-operated means for operating said feeding means, means for directing pressure fluid to said first named fluid-pressure-operated means in response to movement of a shell onto the loader, means for directing pressure fluid to said second named fluid-pressure-operated means in response to movement of a shell onto the feeding means, and means preventing the flow of pressure fluid to said first fluid-pressure-operated means unless the previously fired shell case has been entirely ejected from the gun.

16. In combination, a gun, a loader for elevating shells into alinement with the gun, fluid-pressure-operated means for operating said loader, means for feeding shells onto said loader, fluid-pressure-operated means for operating said feeding means, means for directing pressure fluid to said first named fluid-pressure-operated means in response to movement of a shell onto the loader, means for directing pressure fluid to said second named fluid-pressure-operated means in response to movement of a shell onto the feeding means, a spring operated rammer, means controlled by the loader when the shell is in alinement with the gun for releasing said rammer, and means operated by the rammer after it has completed its ramming stroke for directing pressure fluid to said second fluid-pressure-operated means to return the loader to its initial position.

17. In combination, a gun, a loader for moving shells into alinement with said gun, means carried by said loader engageable with opposite sides of the flange of a shell for preventing endwise movement of the shell therein, and means for retracting said flange-engaging means in response to movement of the loader to carry the shell into ramming position.

18. In combination, a gun, a loader for moving shells into alinement with said gun, clamping means carried by said loader engageable with opposite sides of a shell to hold the shell therein, means carried by the loader engageable with opposite sides of the flange of the shell for preventing endwise movement of the shell therein, means for retracting said clamping means upon movement of the loader into shell-receiving position, and means for retracting said flange engaging means in response to movement of the loader to carry the shell into ramming position.

WILLIAM V. GOODHUE.

REFERENCES CITED

The following references are of record in the file of this patent:

UNITED STATES PATENTS

| Number | Name | Date |
| --- | --- | --- |
| 444,666 | Dinsmore | Jan. 13, 1891 |
| 465,339 | Browning | Dec. 15, 1891 |
| 544,657 | Browning | Aug. 20, 1895 |
| 593,227 | Maxim | Nov. 9, 1897 |
| 653,071 | Dawson et al. | July 3, 1900 |
| 659,507 | Browning | Oct. 9, 1900 |
| 726,251 | Brooks | April 28, 1903 |
| 738,666 | Dawson et al. | Sept. 8, 1903 |
| 752,932 | Snow | Feb. 23, 1904 |
| 811,797 | Schneider | Feb. 6, 1906 |
| 1,038,555 | Frommer | Sept. 17, 1912 |
| 1,179,643 | Meigs et al. | April 18, 1916 |
| 1,402,459 | Swebilius | Jan. 3, 1922 |
| 1,504,393 | Sutton et al. | Aug. 12, 1924 |
| 1,554,830 | Webster | Sept. 22, 1925 |
| 1,709,399 | Herlach et al. | April 16, 1929 |
| 2,110,160 | Larsson | March 8, 1938 |
| 2,112,660 | Hudson | March 29, 1938 |
| 2,122,423 | Joyce | July 5, 1938 |
| 2,151,288 | Waninger | March 21, 1939 |
| 2,365,392 | Cooley | Dec. 19, 1944 |
| 2,425,425 | Jorgensen | Aug. 12, 1947 |

FOREIGN PATENTS

| Number | Country | Date |
| --- | --- | --- |
| 2,574 | Great Britain | of 1896 |
| 125,442 | Great Britain | April 24, 1919 |
| 575,074 | Germany | April 24, 1933 |

OTHER REFERENCES

A. P. C. Application of Prola, Serial No. 306,568, published April 27, 1943.